US012292415B2

(12) United States Patent
Dang et al.

(10) Patent No.: US 12,292,415 B2
(45) Date of Patent: May 6, 2025

(54) SYSTEM AND METHOD FOR LOAD TESTING A LIFT BEAM

(71) Applicant: General Electric Company, Schenectady, NY (US)

(72) Inventors: Van Dang, Bloomfield, CT (US); Robert William Moore, Spartanburg, SC (US); Biswajit Chakrabarty, Kalikapur (IN); Sridhar Velu, Cuddalore (IN)

(73) Assignee: GE Infrastructure Technology LLC, Greenville, SC (US)

( * ) Notice: Subject to any disclaimer, the term of this patent is extended or adjusted under 35 U.S.C. 154(b) by 687 days.

(21) Appl. No.: 17/401,291

(22) Filed: Aug. 12, 2021

(65) Prior Publication Data

US 2022/0390338 A1 Dec. 8, 2022

(30) Foreign Application Priority Data

Jun. 2, 2021 (IN) .............................. 202111024582

(51) Int. Cl.
*G01N 3/10* (2006.01)
*G01M 5/00* (2006.01)

(52) U.S. Cl.
CPC ............ *G01N 3/10* (2013.01); *G01M 5/0025* (2013.01); *G01M 5/0058* (2013.01)

(58) Field of Classification Search
CPC .. G01M 5/0025; G01M 5/0041; G01M 5/005; G01M 5/0058
See application file for complete search history.

(56) References Cited

U.S. PATENT DOCUMENTS

| 5,345,826 | A | 9/1994 | Strong | |
|---|---|---|---|---|
| 6,363,776 | B1 | 4/2002 | Reinert, Sr. | |
| 6,918,306 | B1 | 7/2005 | Cavallaro et al. | |
| 6,938,494 | B2 | 9/2005 | Takada et al. | |
| 7,240,569 | B2 * | 7/2007 | Foley .................... | G01M 5/005 73/862.041 |
| 7,587,946 | B2 * | 9/2009 | Tunney ................. | G01M 5/005 73/857 |

(Continued)

FOREIGN PATENT DOCUMENTS

| CN | 201000411 Y | 1/2008 |
|---|---|---|
| CN | 102235943 A | 11/2011 |
| CN | 210465106 U | 5/2020 |

(Continued)

OTHER PUBLICATIONS

Certex, Testing and Lift Engineering, https://www.certex.com/product-catalog/load-testing-lift-engineering/, 6 pgs. (pp. 371-374.

(Continued)

*Primary Examiner* — Erika J. Villaluna
(74) *Attorney, Agent, or Firm* — Fletcher Yoder, P.C.

(57) ABSTRACT

A system is provided for load testing a lift beam. The system includes a load testing framework configured to support the lift beam, a first connector configured to couple with a lift connector of the lift beam, and a second connector configured to couple with a load connector of the lift beam. The system also includes at least one drive configured to force the first and second connectors away from one another to load test the lift beam.

23 Claims, 9 Drawing Sheets

(56) References Cited

U.S. PATENT DOCUMENTS 11,105,720 B1 * 8/2021 Fayle .................. G01N 3/08
2006/0117866 A1   6/2006 Myers

FOREIGN PATENT DOCUMENTS

GB         2223594  A    4/1990
GB         2433125  A    6/2007

OTHER PUBLICATIONS

European Extended Search Report for EP Application No. 22174500.3 dated Oct. 26, 2022, 8 pgs.
Sels—Selby Engineering And Lifting Safety Ltd.: "LEEA Guidance—The Verification of Lifting Beams—LiftingSafety", Apr. 30, 2018, pp. 1-6, SP055972132, URL:https:/www.liftingsafety.co.uk/site/leea-guidance-verification-of-lifting-beams.htnl [retrieved on Oct. 18, 2022.

* cited by examiner

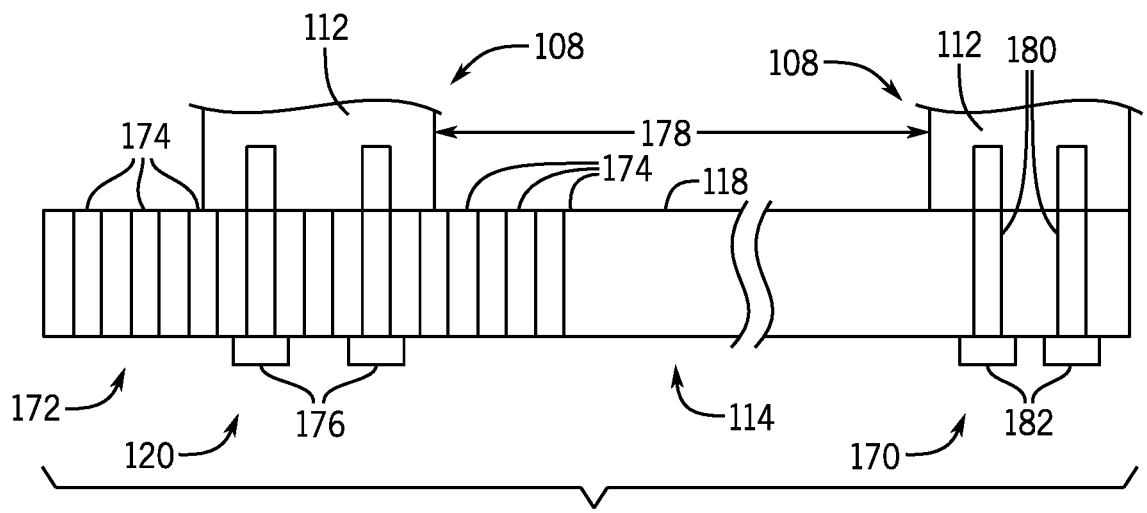
FIG. 3
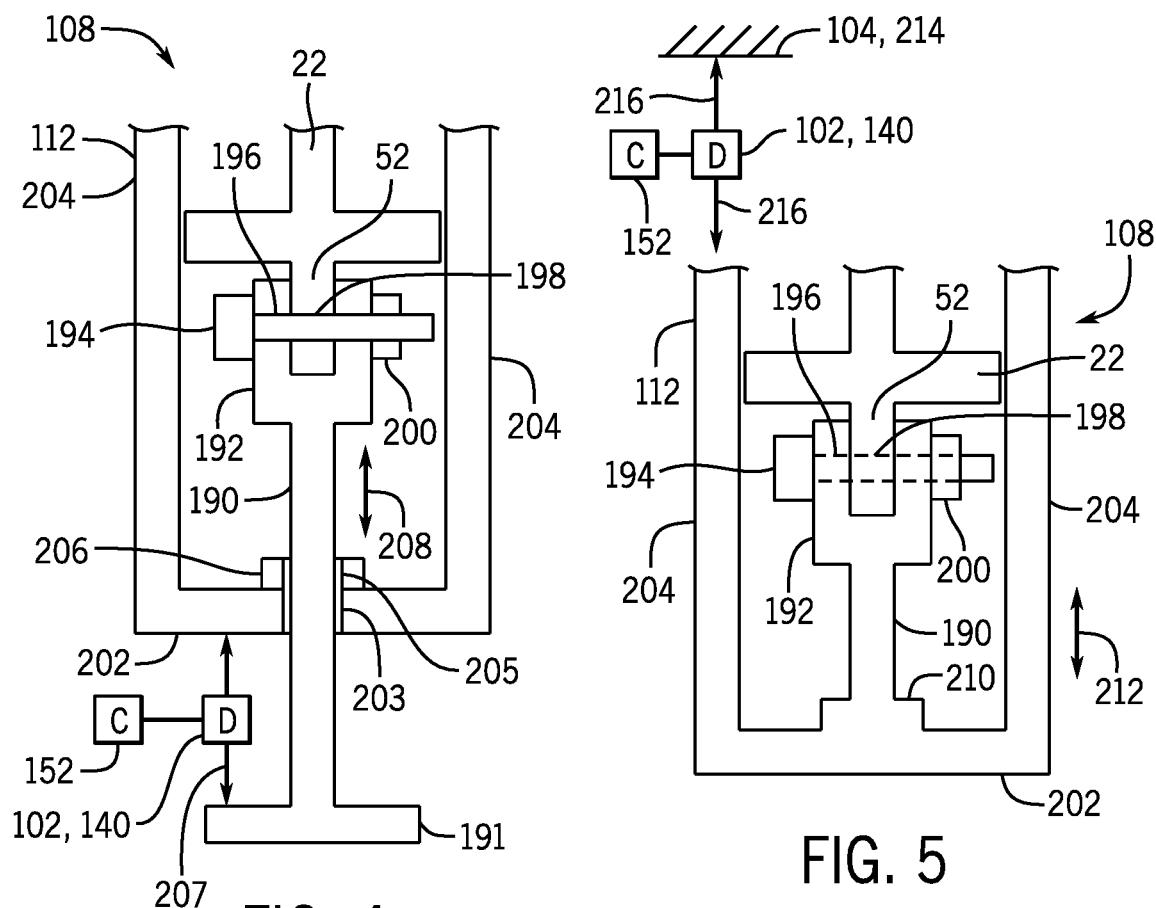
FIG. 4
FIG. 5

SYSTEM AND METHOD FOR LOAD TESTING A LIFT BEAM

CROSS REFERENCE TO RELATED APPLICATION

This application claims priority from and the benefit of India Patent Application No. 202111024582, filed on Jun. 2, 2021, entitled "SYSTEM AND METHOD FOR LOAD TESTING A LIFT BEAM", which is herein incorporated by reference, in its entirety.

BACKGROUND

The present application relates generally to systems and methods for load testing a lift beam.

A lift beam may be used to raise and lower a heavy load during installation, maintenance, or transportation. For example, the load may include a variety of power plant components, a gas turbine engine, a generator, a heat recovery steam generator (HRSG), or any combination thereof. Prior to use, a load test may be performed on the lift beam to ensure integrity of the lift beam. The lift beam may be tested by using large gravity objects, such as concrete blocks, water balloons, or other large masses. Unfortunately, these gravity tests require considerable space and large gravity objects to perform the tests, increasing installation costs and time. Accordingly, a need exists for an improved system and method for load testing a lift beam.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system is provided for load testing a lift beam. The system includes a load testing framework configured to support the lift beam, a first connector configured to couple with a lift connector of the lift beam, and a second connector configured to couple with a load connector of the lift beam. The system also includes at least one drive configured to force the first and second connectors away from one another to load test the lift beam.

In certain embodiments, a system is provided for load testing a lift beam. The system includes a load testing framework having a reaction beam and a plurality of supports coupled to the reaction beam at different axial positions along a longitudinal axis of the reaction beam. The plurality of supports is configured to support the lift beam lengthwise along the longitudinal axis of the reaction beam. The load testing framework further includes a plurality of first connectors coupled to the reaction beam and a plurality of first linkages, wherein each of the plurality of first linkages is configured to extend between and couple one of the plurality of first connectors with a respective one of a plurality of lift connectors of the lift beam. Each of the plurality of first connectors has a plurality of connection joints, and the first linkage is selectively coupled to one of the plurality of connection joints to vary an angle of the first linkage relative to the longitudinal axis of the reaction beam. The load testing framework further includes a plurality of second connectors, wherein each of the plurality of second connectors is configured to couple with a respective one of a plurality of load connectors of the lift beam. Each of the plurality of second connectors is associated with a respective one of the plurality of supports. The load testing framework further includes a plurality of drives configured to force the plurality of first connectors away from the plurality of second connectors to load test the lift beam.

In certain embodiments, a method is provided for load testing a lift beam. The method includes supporting the lift beam with a load testing framework, coupling a first connector with a lift connector of the lift beam, and coupling a second connector with a load connector of the lift beam. The method also includes forcing, via at least one drive, the first and second connectors away from one another to load test the lift beam.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein:

FIG. 3 is a schematic of an embodiment of an adjustable spacer configured to adjust a spacing between the supports of the load testing framework of FIG. 2.

FIG. 4 is a schematic of an embodiment of the load testing framework of FIG. 2, illustrating a direct connection between a drive and a load connector of the lift beam.

FIG. 5 is a schematic of an embodiment of the load testing framework of FIG. 2, illustrating an embodiment of the support having a linkage connected between the support and the load connector and a drive coupled to the support.

DETAILED DESCRIPTION

Figure 1:
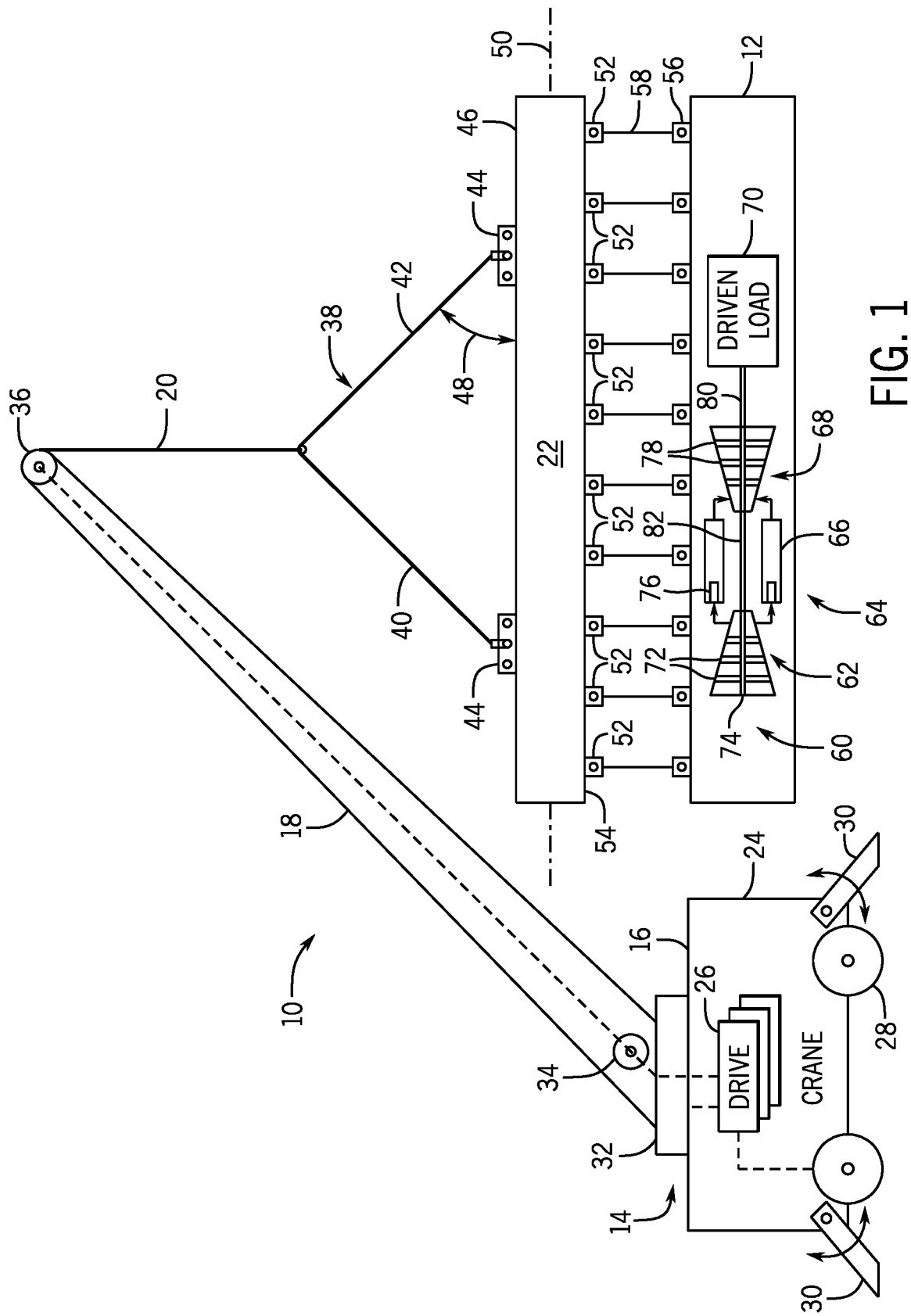
FIG. 1 is a schematic of an embodiment of a lifting system having a lift beam configured to raise a load.

One or more specific embodiments of the presently disclosed systems are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

As discussed below, the disclosed embodiments relate to systems and methods for load testing a lift beam (or other lift structure), which may be used to lift heavy loads. The lift beam may include, for example, a spreader bar, a lift frame or framework, an erection head piece, or any other lift structure. For example, the lift beam may be an I-beam having an H-shaped cross-section. The lift beam may be a one-piece structure or a multi-piece structure. The lift beam may be made of a single material or multiple materials, including one or more metals, plastics, wood, fabric, or composite materials (e.g., fiber-reinforced plastics, metal matrix composites, etc.). The lift beam may include a plurality of beams, arms, or rigid members coupled together (e.g., welded or bolted together) to define a framework. The lift beam is specifically designed for lifting applications, which generally involve moving the heavy loads from one location to another. For example, the lift beam may be used for moving the heavy loads vertically, horizontally, between orientations (e.g., between horizontal and vertical orientations), rotationally, or any combination thereof. The lift beam may be designed to lift heavy loads, such as a variety of power plant components, a gas turbine engine, a steam turbine, a wind turbine, a hydro turbine, an electric generator, a heat exchanger, a heat recovery steam generator (HRSG), a gasifier, a gas treatment unit, a compressor, a vehicle, industrial machinery, a casing or housing, or any combination thereof. In certain embodiments, the lift beam may be used for moving the heavy loads in a stationary location (e.g., on land) or in a mobile location (e.g., on a ship, marine port, etc.). Accordingly, the load testing may be particularly helpful in avoiding damage to the heavy loads, lifting locations, surrounding equipment, and personnel.

The disclosed embodiments perform load testing with one or more drives configured to generate and apply forces onto a lift beam for load testing. The drives generally convert an input energy (e.g., electrical energy, thermal energy, pressure energy, etc.) into an output force, which is applied to the lift beam for load testing. For example, the drives may include fluid drives (e.g., hydraulic drives and/or pneumatic drives using fluid pressure to drive an element such as a piston), electric drives (e.g., electric motors), gear assemblies, leverage assemblies (e.g., one or more leverage arms or beams), or any combination thereof. For load testing, these drives take considerably less space than corresponding gravity objects (e.g., concrete blocks, water balloons, etc.), are much easier to handle than corresponding gravity objects, and enable testing in a variety of orientations (e.g., horizontal, vertical, angled between horizontal and vertical, etc.). The drives may be coupled directly and/or indirectly to the lift beam at multiple lift connectors and/or load connectors. The drives also may enable variation in the load distribution along the lift beam. In certain embodiments, the drives may be used completely without any gravity objects for load testing, or the drives may be used in combination with some gravity objects (e.g., supplemented with gravity objects) for load testing. The following discussion presents various aspects of load testing using one or more drives.

FIG. 1 is a schematic of an embodiment of a lifting system 10 configured to raise, laterally move and lower a load 12. The illustrated embodiment is merely an example application of the lifting system 10 to provide context for the load testing discussed in further detail below. In the illustrated embodiment, the lifting system 10 includes a crane 14 having a platform 16, a boom 18 extending from the platform 16, and a cable 20 configured to be extended and retracted to raise and lower a lift beam 22. The platform 16 includes a housing 24, one or more drives 26 disposed in the housing 24, a set of wheels 28 coupled to the housing 24, and a plurality of outriggers 30 coupled to the housing 24. The one or more drives 26 may include a combustion engine, an electric motor, or another suitable drive configured move the boom 18, the cable 20, the wheels 28, and or the outriggers 30.

For example, the one or more drives 26 may be coupled to a rotatable base 32 between the housing 24 and the boom 18, such that the rotatable base 32 may be driven to rotate the boom 18 for laterally moving the lift beam 22. Additionally, the one or more drives 26 may be coupled to a winch 34, such that the winch 34 may be configured to extend and retract the cable 20 coupled to the lift beam 22. The one or more drives 26 also may be coupled to the outriggers 30, such that the drives 26 can retract the outriggers 30 while moving the platform 16 and extend the outriggers 30 to provide stability for the platform 16 during lifting.

The cable 20 may extend from the winch 34 along the boom 18 to a sheave or pulley wheel 36, such that the cable 20 may be smoothly extended and retracted to lower and raise the lift beam 22 supporting the load 12. The cable 20 may extend to or split into a split cable section 38 having a plurality of cable portions coupled to the lift beam 22. For example, the split cable section 38 may include cable portions 40 and 42 coupled to lift connectors 44 on a top portion 46 of the lift beam 22. As illustrated, the cable portions 40 and 42 are coupled to the lift connectors 44 on the top portion 46 at an angle 48 relative to a longitudinal axis 50 of the lift beam 22. The load 12 is coupled to a plurality of load connectors 52 along a bottom portion 54 of the lift beam 22. Each of the load connectors 52 may be coupled to a corresponding load connector 56 on the load 12 via an intermediate linkage or cable 58. Each of the connectors 44, 52, and 56 may include a flange or bracket having one or more receptacles configured to mate with the respective cable 40, 42 or linkage 58.

The lift beam 22 may be configured to lift a variety of loads 12, such as a gas turbine engine 60. In the illustrated embodiment, the gas turbine engine 60 includes a compressor section 62 having one or more compressor stages, a combustion section 64 having one or more combustors 66, and a turbine section 68 having one or more turbine stages. The gas turbine engine 60 is also coupled to a driven load 70, such as an electric generator. The compressor section 62 may include a single stage or multiple stages of compressor blades 72 coupled to a shaft 74 driven by the turbine section 68. The combustors 66 may include one or more fuel nozzles 76 configured to inject fuel and air into the combustors 66 for combustion. In turn, the combustors 66 direct hot combustion gases into the turbine section 68 to drive a single stage or multiple stages of turbine blades 78 coupled to a shaft 80. The shafts 74 and 80 may be an integral shaft or may be coupled together via an intermediate shaft 82. Additionally, the shafts 74, 80, and 82 may be coupled to the driven load 70. The driven load 70 may be proximate to the turbine section 68, as shown, or may be proximate to the compressor section 62.

In operation, the compressor section 62 receives and compresses an intake air to produce a compressed air and routes the compressed air into each of the combustors 66. The compressed air mixes with fuel from the fuel nozzles 76 for combustion of a fuel-air mixture in the combustors 66, thereby generating hot combustion gases. The combustion gases then enter the turbine section 68, drive rotation of the turbine blades 78 in one or more turbine stages, and thus drive rotation of the shafts 74, 80, and 82, the compressor section 62, and the driven load 70. Although the illustrated embodiment depicts a gas turbine engine 60, the load 12 may include a steam turbine, a reciprocating piston cylinder engine, or other machinery or cargo.

Prior to the initial deployment of the lift beam 22, a lift test may be performed on the lift beam 22 to ensure that the lift beam 22 can function properly and handle the load requirements for the particular application. For example, the lift beam 22 may be subjected to a load at the load connectors 52. The load test of the lift beam 22 may employ a variety of techniques to apply a load to simulate the actual load 12.

One possible load test technique for the lift beam 22 may use a variety of weights or gravity objects (i.e., gravity-based load test), such as concrete blocks, steel plates or blocks, water balloons, or some other large object to simulate the load 12. Unfortunately, the use of large gravity objects may require significant space for performing the test. The gravity-based load tests may employ one or more gravity objects, which collectively weight greater than 400, 500, 600, or more metric tons. If water bags are used for the gravity objects, then the water bags may hold greater than 500 cubic meters of water.

These gravity-based load tests may employ one or more large cranes, which increases the footprint (or ground space) and height (or vertical space) associated with the load tests. The footprint may be greater than 40 meters×80 meters and the height may be greater than 15 meters to accommodate the gravity objects hanging from the lift beam. In many locations (e.g., countries, cities, and/or beam manufacturing sites), the gravity-based load tests may not be feasible due the costs associated with the large cranes and due to limited space for the cranes and gravity objects (e.g., storage of concrete blocks and/or availability of water for water bags). As a result, the gravity-based load tests may be performed at a testing site away from the beam manufacturing site, thereby increasing costs and causing delays due to transportation between the sites. For example, a lift beam may be manufactured at the beam manufacturing site, the lift beam may be transported to and tested at the testing site, the lift beam may be transported back to the beam manufacturing site for further manufacturing and/or reworking, and then the lift beam may be transported back to the testing site for another load test. Each instance of transportation may cause further delays and increase costs associated with the lift beam.

In the disclosed embodiments, as discussed in further detail below, the load test of the lift beam 22 may employ one or more drives (e.g., hydraulic drives, electric drives, etc.) to simulate the load associated with actual use in a particular application (e.g., a drive-based load test). The drive-based load test does not require the use of large weights, such as concrete blocks, metal blocks or plates, or water balloons. As a result, the drive-based load test may occupy a considerably smaller space (e.g., smaller footprint (or ground space) and/or height (vertical space)) as compared with the gravity-based load test. The smaller space for the drive-based load test enables manufacturers with space constraints to perform the drive-based load test on-site, rather than transporting the lift beam to a remote testing site for a gravity-based load test. The on-site drive-based load test (e.g., at the beam manufacturing site) helps to reduce costs and time delays associated with transportation to and from a remote testing site.

Figure 2:
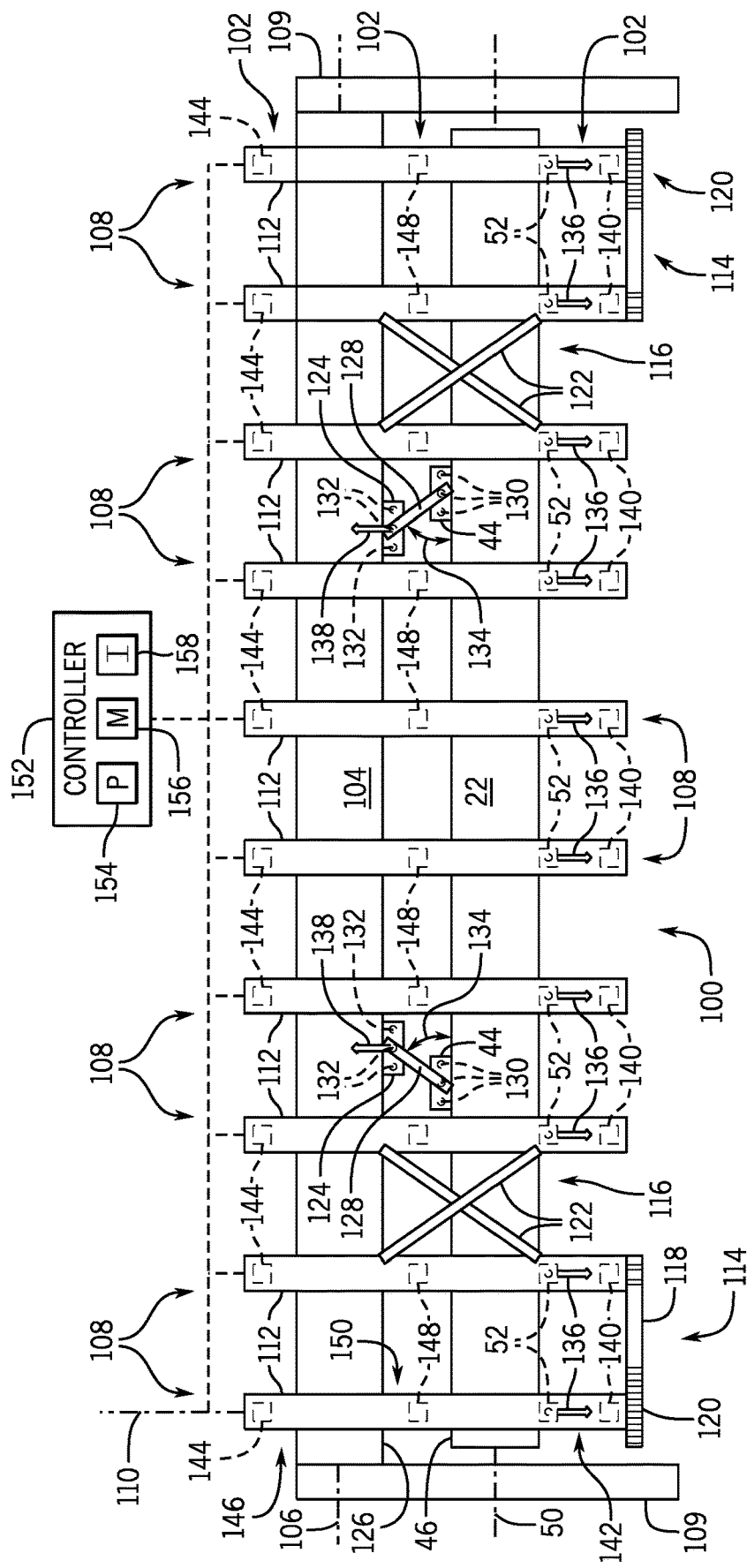
FIG. 2 is a schematic of an embodiment of a load testing framework having a reaction beam, a plurality of supports disposed about a lift beam, and a plurality of drives configured to perform a load test on the lift beam.

FIG. 2 is a schematic of an embodiment of a load testing framework 100 having a plurality of drives 102 configured to provide forces to load test the lift beam 22. As illustrated, the load testing framework 100 includes a reaction beam 104 extending lengthwise along the lift beam 22, such that the longitudinal axis 50 of the lift beam 22 extends along (e.g., parallel with) the longitudinal axis 106 of the reaction beam 104. Additionally, the load testing framework 100 includes a plurality of supports 108 coupled to the reaction beam 104 and the lift beam 22 at a plurality of different axial positions along the longitudinal axes 50 and 106 of the lift beam 22 and the reaction beam 104, respectively. The load testing framework 100 may be oriented in a horizontal orientation, a vertical orientation, or any other suitable orientation (e.g., an angled orientation between horizontal and vertical orientations). For example, the load testing framework 100 may include beam supports or mounts 109 coupled to the reaction beam 104, wherein the mounts 109 are configured to hold the load testing framework 100 in the desired orientation relative to the ground or a foundation.

Each of the supports 108 extends along an axis 110, which is crosswise (e.g., perpendicular) to the reaction beam 104 and the lift beam 22. The supports 108 may be spaced equally or variably at different axial positions along the reaction beam 104 and the lift beam 22. Each of the supports 108 may extend along and/or around 1, 2, 3 or 4 sides of the lift beam 22 and the reaction beam 104. For example, each of the supports 108 may be a frame 112 extending around the lift beam 22 and the reaction beam 104. The supports 108 are designed to accommodate movement (e.g., deflection) of the lift beam 22 and the reaction beam 104 along the axis 110, for example, as the lift beam 22 and/or the reaction beam 104 bends (e.g., bows) during load testing via application of forces by the drives 102. For example, during load testing, the lift beam 22 and the reaction beam 104 may bend (e.g., bow) inwardly toward one another or outwardly away from one another, and each support 108 accommodates any deflection of the beams 22 and 104 at the respective support 108.

The axial spacing between the supports 108 may be set by one or more adjustable spacers 114 and/or fixed spacers 116. In the illustrated embodiment, the adjustable spacers 114 are coupled to the supports 108 at the opposite end portions of the lift beam 22 and the reaction beam 104, while the fixed spacers 116 are coupled to the supports 108 along the intermediate portions of the lift beam 22 and the reaction beam 104. Although the adjustable spacers 114 and the fixed spacers 116 are not shown coupled to all of the supports 108, the illustrated embodiment may include one or both of these spacers 114 and 116 between each pair of adjacent supports 108. For example, the adjustable spacers 114 may be used between each adjacent pair of the supports 108 along the entire length of the beams 22 and 104, the fixed spacers 116 may be used between each adjacent pair of supports 108 along the entire length of the beams 22 and 104, or a combination of both types of spacers 114 and 116 may be used for the supports 108 along the length of the beams 22 and 104.

In the illustrated embodiment, the adjustable spacer 114 includes a lateral support or arm 118 coupled to the adjacent supports 108. The lateral arm 118 also includes an adjustable connection 120 configured to vary the spacing between the adjacent supports 108 in the axial direction along the longitudinal axis 50. The fixed spacer 116 may include a pair of angled arms 122, such as angled arms arranged in a X-shaped pattern between the adjacent supports 108. The angled arms 122 may be fixedly coupled to the supports 108 via welds, or removably coupled the supports 108 via fasteners (e.g., threaded fasteners such as bolts). During load testing, the beams 22 and 104 may undergo some bending (e.g., bowing), which may result in different amounts of deflection at each support 108. The adjustable spacer 114 and the fixed spacer 116 are configured to accommodate this bending (and deflection) of the beams 22 and 104 between the different supports 108. For example, the adjustable spacer 114 and the fixed spacer 116 may help to maintain each support 108 in an orientation perpendicular to the beams 22 and 104 and parallel to the other supports 108.

In the illustrated embodiment, the lift beam 22 is coupled to the reaction beam 104 via the lift connectors 44 on the top portion 46 of the lift beam 22, connectors 124 on a bottom portion 126 of the reaction beam 104, and linkages 128 extending between the connectors 44 and 124. Each of the connectors 44 and 124 may include a single connection joint or a plurality of connection joints to facilitate a connection of the linkage 128 at one or more angles 134 between the beams 22 and 104. For example, each lift connector 44 may include a plurality of connection joints 130, each connector 124 may include a plurality of connection joints 132, or a combination thereof. Each of the plurality of connection joints 130 and 132 may include 2, 3, 4, 5, 6, 7, 8, 9, 10, or more connection joints spaced apart from one another in the axial direction along the longitudinal axes 50 and 106. Accordingly, the linkage 128 may be coupled to different pairs of the connection joints 130 and 132 to vary an angle 134 of the linkage 128 relative to the longitudinal axes 50 and 106. The ability to vary the angle 134 of the linkage 128 may facilitate better simulation of an actual lifting system, such as the lifting system 10 being used to lift the lift beam 22 coupled to the load 12 as discussed above with reference to FIG. 1. Accordingly, the adjustability of the linkages 128 may facilitate more versatile testing of different lift beams 22 and lifting scenarios.

In the illustrated embodiment, the one or more drives 102 may be configured to apply forces to simulate lifting of the lift beam 22 coupled to a load, such as the load 12. Accordingly, the one or more drives 102 may apply one or more forces to force the lift connectors 44 and the load connectors 52 away from one another in the direction of the axis 110 as illustrated by arrows 136 on the load connectors 52 and arrows 138 on the connectors 124 coupled to the lift connectors 44 via the linkages 128. Accordingly, the forces depicted by arrows 136 and 138 may simulate a lifting scenario using the drives 102 rather than gravity objects, such as large concrete blocks, metal blocks or plates, water balloons, etc.

The drives 102 may be arranged in a variety of locations throughout the supports 108, such as drives 140 disposed at a distal end portion 142 adjacent the lift beam 22, drives 144 disposed at a distal end portion 146 adjacent the reaction beam 104, and/or drives 148 disposed at an intermediate portion 150 of the supports 108 at or between the beams 22 and 104. However, the drives 102 may be disposed at any location along each of the supports 108, at any location relative to the beams 22 and 104, and/or at any location in between the supports 108.

In certain embodiments, one or more drives 102 may be directly and/or indirectly coupled to the load connectors 52, thereby providing forces to drive the load connectors 52 away from the lift connectors 44. In some embodiments, one or more drives 102 may be directly and/or indirectly coupled to the connectors 124 and/or the reaction beam 104 to drive the connectors 124 and the reaction beam 104 away from the lift connectors 44. Additionally, the drives 102 may be configured to move the supports 108 relative to the lift beam 22 and/or the reaction beam 104, thereby providing forces to bias the lift connectors 44 away from the load connectors 52 as indicated by arrows 136 and 138. Any of these scenarios with the drives 102 may be used alone or in combination with one another to provide the forces to simulate a load test of the lift beam 22.

The drives 102 are also communicatively coupled to one or more controllers, such as a controller 152 having a processor 154, memory 156, and instructions 158 stored on the memory 156 and executable by the processor 154 to facilitate load testing using the drives 102. For example, the controller 152 may include one or more load testing routines configured to test various types of lift beams 22 and/or lifting scenarios. For example, the controller 152 may execute a lifting simulation having uniform forces applied to each of the load connectors 52, such as a load having a uniform weight distribution. Additionally, the controller 152 may be configured to perform a load test having a non-uniform distribution of forces along the load connectors 52, such as by applying different forces among each of the drives 102 coupled to the different supports 108. The controller 152 also may be configured to perform tests having a steady state application of forces via the drives 102, so that the lift beam 22 can be load tested with a constant force versus time for simulating the load 12. Alternatively, the controller 152 may be configured to vary the forces applied to the load connectors 52 and/or the lift connectors 44 over time to simulate variations in the forces applied during a lifting application. These forces may include high and low forces that may simulate actual operation of the lifting system 10 as illustrated in FIG. 1. In certain embodiments, the variation of forces over time may simulate a load test during certain environmental conditions (e.g., wind, earthquake, etc.) and/or a mobile scenario (e.g., on a marine vessel or port during wavy water conditions).

In certain embodiments, the load test framework 100 may be configured for a horizontal orientation, a vertical orientation, and/or an acutely angled orientation between horizontal and vertical orientations, thereby facilitating load testing of the lift beam 22 in the selected orientation. The lift beam 22 may be designed to lift a desired load approximately 10 times the weight of the lift beam 22. For example, the lift beam 22 may weight approximately 40 metric tons, while the desired load may be approximately 400 metric tons. For load testing, the desired load may be multiplied by a factor of safety, such as 1.25, 1.5, or more. As an example, if the factor of safety is 1.25, then the load test may apply forces to simulate a load of approximately 500 metric tons. The simulated load may be distributed among a plurality of the drives 108 (e.g., one drive 108 per frame 112 and load connector 52). For example, if the load test framework 100 includes ten drives 108, then the 500 metric ton load test may be divided into ten applied loads of 50 metric tons per drive 108. The simulated load also may be adjusted to compensate for friction in a horizontal orientation, weight in a vertical or acutely angled orientation, or other factors.

In the horizontal orientation, the forces applied by the drives 108 on the lift beam 22 at the lift and load connectors 44 and 52 may be substantially equal to a desired load (e.g., weight of load to be lifted by the lift beam) plus a factor of safety. The horizontal orientation of the lift beam 22 may cause some friction between the lift beam 22 and the load test framework 100; however, the load test may compensate for the friction by adjusting the forces applied by each drive 108. In the horizontal orientation, the weight of the beam 22 may not contribute to the forces applied during the load test. In the vertical or acutely angled orientations, the weight of the lift beam 22 and/or the weight of at least part of the load testing framework 100 may also contribute to the forces applied to the lift and load connectors 44 and 52.

FIG. 3 is a schematic of an embodiment of the adjustable spacer 114 of FIG. 2, further illustrating details of the connections at the adjacent supports 108. As illustrated, the lateral arm 118 is coupled to the supports 108 via the adjustable connection 120 and a connection 170. The adjustable connection 120 includes a plurality of connection joints 172 at different axial positions along the lateral arm 118. The connection joints 172 may include fastener receptacles 174 configured to receive threaded fasteners 176 at different positions relative to the support 108. As illustrated, the number of fastener receptacles 174 is greater than the number of threaded fasteners 176 used to secure the lateral arm 118 to the support 108, such that the threaded fasteners 176 may be used in different fastener receptacles 174 further away from or closer to the connection 170, thereby varying an axial spacing 178 between the adjacent supports 108. The connection 170 may include an equal number of fastener receptacles 180 and corresponding threaded fasteners 182 configured to secure the lateral arm 118 to the respective support 108. Accordingly, the adjustable spacer 114 is configured to provide stability between the adjacent supports 108, while allowing a variable axial spacing 178 between the adjacent supports 108 at any location along the load testing framework 100 of FIG. 2.

As discussed above, the load testing framework 100 may include a plurality of drives 102 disposed at various locations throughout the supports 108, and the drives 102 may be configured to apply forces directly and/or indirectly to the connectors 44 and/or 52, or directly and/or indirectly to the supports 108, or a combination thereof. As illustrated in FIG. 4, the drive 102, 140 is directly coupled to the load connector 52. For example, the drive 102 is coupled to the load connector 52 of the lift beam 22 via an intermediate shaft or linkage 190 having a U-shaped connector 192 disposed about the load connector 52. As illustrated, the U-shaped connector 192 extends around opposite sides of the load connector 52, and a threaded fastener 194 (e.g., a bolt) extends through receptacles 196 in the U-shaped connector 192 and a receptacle 198 in the load connector 52, and then a female threaded fastener 200 (e.g., nut) is coupled to the threaded fastener 194. The frame 112 of the support 108 includes a bottom frame portion 202 and opposite lateral frame portions 204. Although the frame does not depict an upper section, the frame 112 also may include an upper frame portion. The bottom frame portion 202 also includes one or more bushings 206 disposed about the shaft or linkage 190. The bottom frame portion 202 and the bushings 206 include openings 203 and 205, respectively, to permit passage of the shaft or linkage 190.

In operation, the drive 102 is configured to apply a force to move the shaft or linkage 190 in the direction of arrow 208. In the illustrated embodiment, the drive 102 is mounted between the frame 112 (e.g., the bottom frame portion 202) and a head portion 191 of the shaft or linkage 190. The head portion 191 may include a piston, an enlarged structure relative to the shaft or linkage 190, a plate, or a bar. Accordingly, the drive 102 may apply forces 207 between the head portion 191 and the frame 112, thereby causing movement of the shaft or linkage 190 as indicated by arrow 208. For example, the drive 102 may be configured to move the shaft or linkage 190 in a first direction (e.g., creating tension in the shaft or linkage 190) to apply a tensile force on the load connector 52 of the lift beam 22, which also imparts a tensile force on the lift connector 44. By further example, the drive 102 may be configured to move the shaft or linkage 190 in an opposite second direction (e.g., creating compression in the shaft or linkage 190) to apply a compressive force on the load connector 52 of the lift beam 22, which also imparts a compressive force on the lift connector 44. As discussed further below, the drive 102 may include a variety of types of drives, such as a fluid drive, an electric drive, and so forth.

FIG. 5 is a schematic of an embodiment of the support 108 having a configuration of the drive 102, 140 configured to move the support 108 relative to the lift beam 22. The embodiment of FIG. 5 has a similar connection between the load connector 52 and the shaft or linkage 190 as discussed above with reference to FIG. 4. However, in contrast to FIG. 4, the embodiment of FIG. 5 has the shaft or linkage 190 coupled to the bottom frame portion 202 of the frame 112 at a base plate or mount 210. In other words, the shaft or linkage 190 is not driven to move directly by the drive 102, but rather the shaft or linkage 190 is in a fixed position relative to the frame 112 via the base mount 210 coupled to the bottom frame portion 202. The base mount 210 may be coupled to the base frame portion 202 via a welded joint or a plurality of threaded fasteners.

In contrast to FIG. 4, in the embodiment of FIG. 5, the drive 102 is coupled to the frame 112. The drive 102 may be disposed at any location relative to the frame 112, the lift beam 22, and the reaction beam 140. In operation, the drive 102 is configured to apply a force to move the frame 112 as indicated by arrow 212, thereby applying a force between the frame 112 and the load connector 52 (e.g., an indirect application of force from the drive 102 to the load connector 52). For example, the drive 102 may be mounted between the frame 112 and a reference structure 214, such as the reaction beam 104 or a drive mount coupled to the ground. The reference structure 214 (e.g., reaction beam 104) may be disposed in a fixed position relative to the frame 112, the lift beam 22, and/or the ground. Accordingly, the drive 102 may apply forces 216 between the reference structure 214 and the frame 112, thereby causing movement of the frame 112 as indicated by arrow 212. For example, the drive 102 may be configured to move the frame 112 in a first direction (e.g., creating tension in the shaft or linkage 190) to apply a tensile force on the load connector 52 of the lift beam 22, which also imparts a tensile force on the lift connector 44. By further example, the drive 102 may be configured to move the frame 112 in an opposite second direction (e.g., creating compression in the shaft or linkage 190) to apply a compressive force on the load connector 52 of the lift beam 22, which also imparts a compressive force on the lift connector 44.

Figure 6:
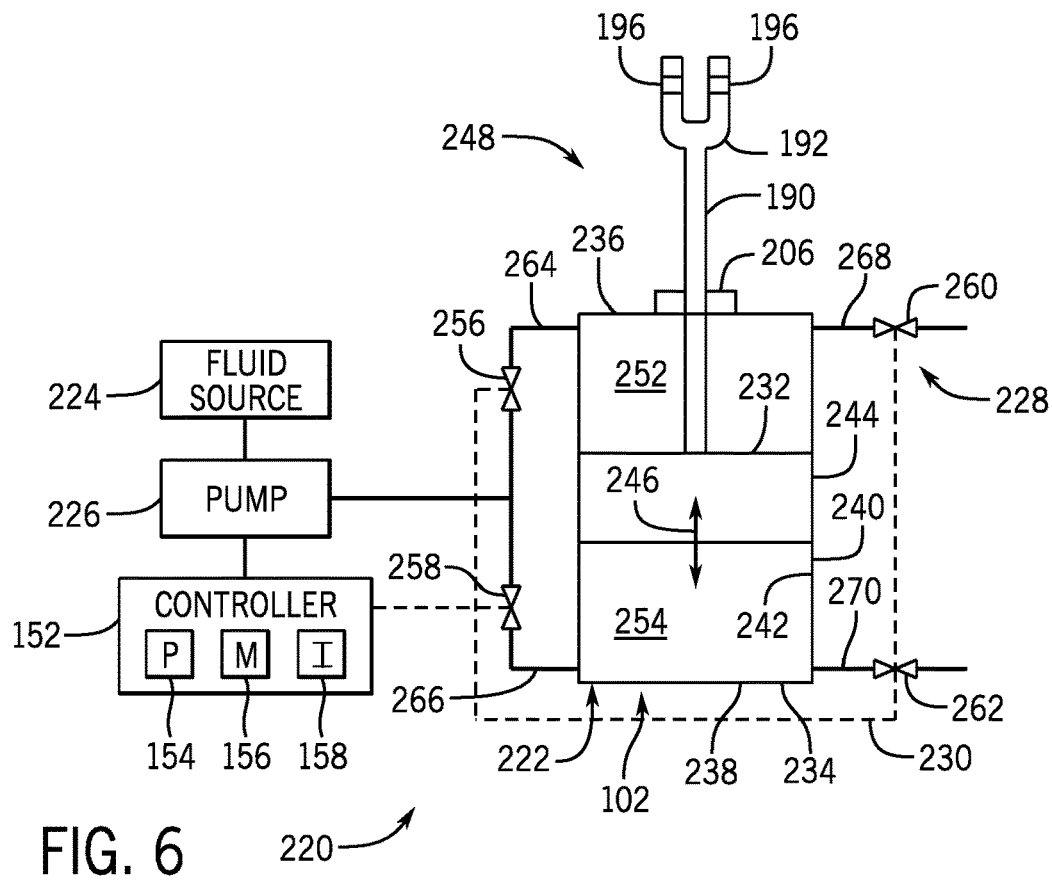
FIG. 6 is an embodiment of a fluid drive system having a piston cylinder assembly configure to provide a fluid driven force for load testing the lift beam of FIG. 2.

FIG. 6 is a schematic of an embodiment of a fluid drive system 220 that may be used for the drives 102 in the embodiments of FIGS. 2, 4, and 5. As illustrated, the fluid drive system 220 includes the controller 152, a piston cylinder assembly 222, a fluid source 224, a pump 226, one or more valves 228, and one or more control lines 230. The controller 152 is coupled to the pump 226 and the one or more valves 228 via the control line(s) 230. In certain embodiments, the fluid source 224 may include a hydraulic fluid, a gas (e.g., air or nitrogen), or another suitable liquid or gas. The pump 226 may be an electric motor driven pump, such as a reciprocating pump or a rotary pump.

The piston cylinder assembly 222 may include a piston 232 disposed in a housing or body 234. The body 234 may include opposite end portions 236 and 238 connected by a side portion or lateral wall 240. The lateral wall 240 defines a cylinder 242 or inner cylindrical portion of the body 234. The piston 232 may have a cylindrical piston body 244, which reciprocates between the end portions 236 and 238 along the cylinder 242 as indicated by arrow 246. The piston 232 is coupled to the shaft or linkage 190, which also has the U-shaped connector 192 with receptacles 196 configured to couple with the load connector 52 of the lift beam 22 as discussed above with reference to FIGS. 4 and 5. The piston 232 and the shaft or linkage 190 also may be described as translating components 248, as these components move or reciprocate back and forth as indicated by arrow 246. The body 234 also includes the bushing 206 at the end portion 236, such that the bushing 206 seals around the shaft or linkage 190 and facilitates the reciprocating motion of the shaft or linkage 190. The body 234 also defines opposite fluid chambers 252 and 254 disposed on opposite sides of the piston 232 adjacent the end portions 236 and 238, respectively.

The valves 228 may include supply valves 256 and 258 and pressure release valves 260 and 262 coupled to the controller 152 via the control line 230 and coupled to the body 234 via fluid lines or conduits 264, 266, 268 and 270. For example, the supply valve 256 is fluidly coupled to the pump 226 and the fluid chamber 252 via the fluid line or conduit 264, while the supply valve 258 is fluidly coupled to the pump 226 and the fluid chamber 254 via the fluid conduit 266. Similarly, the pressure release valve 260 is fluidly coupled to the fluid chamber 252 via the fluid line or conduit 268, while the pressure release valve 262 is fluidly coupled to the fluid chamber 254 via the fluid line or conduit 270. The controller 152 is configured to control the pump 226 and the valves 228 to facilitate fluid pressure in the alternating fluid chambers 252 and 254 to facilitate reciprocating motion of the piston 232.

For example, the controller 152 may facilitate movement of the shaft or linkage 190 and the piston 232 in a direction away from the end portion 236 and toward the end portion 238 of the body 234 by supplying fluid pressure from the fluid source 224 through the pump 226 and the fluid conduit 264 into the fluid chamber 252 while releasing fluid pressure from the fluid chamber 254 through the fluid conduit 270. Accordingly, the controller 152 may be configured to control the valves 228 such that the supply valve 256 is open, the supply valve 258 is closed, the pressure release valve 260 is closed, and the pressure release valve 262 is open. Additionally, the controller 152 may be configured to control the pump 226 to pump the fluid (e.g., hydraulic fluid, air, or another liquid or gas) from the fluid source 224 through the fluid conduit 264 and the supply valve 256 into the fluid chamber 252. As the fluid pressure builds within the fluid chamber 252, the fluid pressure forces the piston 232 to move away from the end portion 236 towards the end portion 238, thereby causing axial movement or translation of the shaft or linkage 190 coupled to the load connector 52 via the U-shaped connector 192. This motion of the piston 232 and the shaft or linkage 190 may impart a force on the load connectors 52 as indicated by arrows 136 in FIG. 2.

The controller 152 also may be configured to control the pump 226 and the valves 228 to provide fluid pressure in the chamber 254 and release pressure from the fluid chamber 252 to facilitate movement of the piston 232 and the shaft or linkage 190 in a direction away from the end portion 238 toward the end portion 236. This motion may be used to provide a compressive force on the lift beam 22 as illustrated in FIG. 2. Accordingly, the controller 152 may be configured to control the valves 228 such that the supply valve 256 is closed, the supply valve 258 is open, the pressure release valve 260 is open, and the pressure release valve 262 is closed. Additionally, the controller 152 may be configured to control the pump 226 to pump fluid (e.g., hydraulic fluid, air, or another liquid or gas) from the fluid source 224 through the fluid conduit 266 and the supply valve 258 into the fluid chamber 254, thereby driving the piston 232 away from the end portion 238 toward the end portion 236. Accordingly, the controller 152 may be configured to provide motion of the piston 232 and the shaft of linkage 190 in opposite directions as indicated by arrow 246. The fluid drive system 220 of FIG. 6 may be used as the drive 102 (e.g., a fluid drive) for any one of the drives 102 illustrated in FIG. 2 or in any of the other illustrations in the present application.

Figure 7:
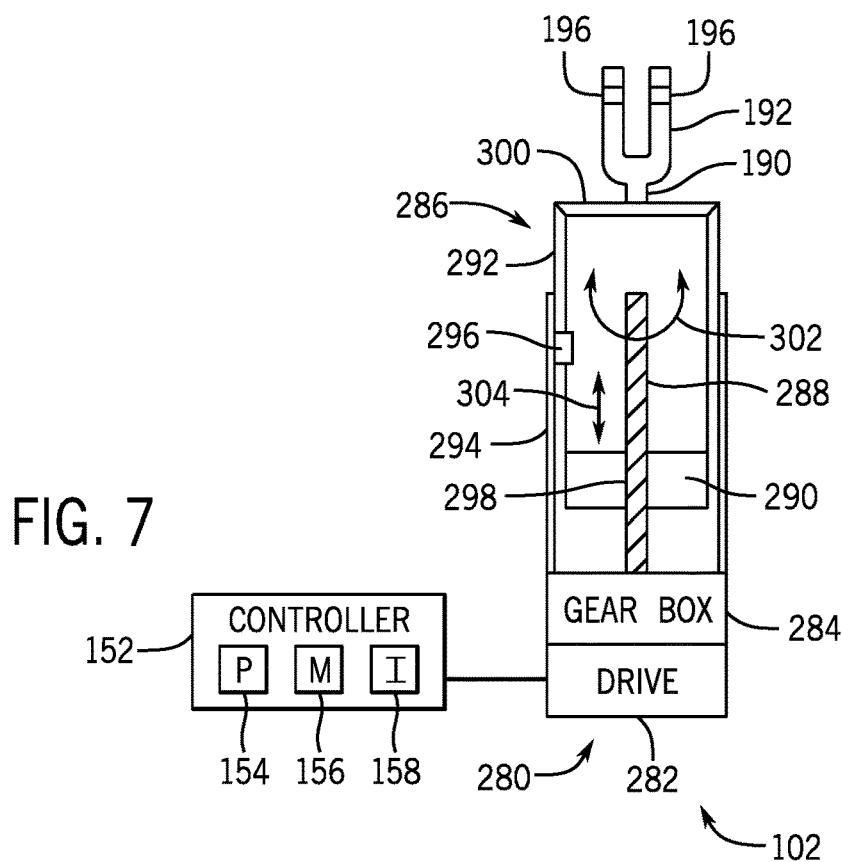
FIG. 7 is a schematic of an embodiment of a geared drive system configured to provide a force for load testing the lift beam of FIG. 2.

FIG. 7 is a schematic of an embodiment of a geared drive system 280 that may be used for one or more of the drives 102 discussed above with reference to FIGS. 2, 4, and 5. As illustrated, the geared drive system 280 includes the controller 152, a drive 282, a gear box 284, and a threaded actuation assembly 286. As illustrated, the controller 152 is communicatively coupled to the drive 282, such that the controller 152 can control the drive 282 to provide motion into the gear box 284 to facilitate movement of the threaded actuation assembly 286. In certain embodiments, the drive 282 may include an electric motor or drive, a fluid motor or drive such as the fluid drive system 220 of FIG. 6, or another suitable drive or motor. The gear box 284 may be configured to change the gear ratio between the drive 282 and the threaded actuation assembly 286, such as changing the gear ratio to provide more torque from the drive 282 to the threaded actuation assembly 286. The threaded actuation assembly 286 includes a male threaded shaft or portion 288, a female threaded nut or portion 290, an inner body or sleeve 292, an outer body or sleeve 294, and an axial guide 296 disposed between the inner and outer sleeves 292 and 294.

The male and female threaded portions 288 and 290 interface one another along a threaded or spiral interface 298, such that rotation of the male threaded portion 288 causes the female threaded portion 290 to move lengthwise along the male threaded portion 288 while the axial guide 296 blocks rotation of the female threaded portion 290 and the inner body or sleeve 292. In operation, the drive 282 may impart a rotational motion via a shaft into the gear box 84, which may change the gear ratio and provide rotational motion of the male threaded portion 288, which in turn enables the female threaded nut 290 to move along the male threaded portion 288. The female threaded portion 290 may be removably or fixedly coupled to the inner sleeve 292, such that the female threaded portion 290 and the inner sleeve 292 move axially together along the interior of the outer sleeve 294. The axial guide 296 may include a male protrusion or key disposed in an axial slot. The inner and outer bodies or sleeves 292 and 294 may be annular or cylindrical bodies or sleeves, such as a cylindrical tubular member. The inner body or sleeve 292 also may include a head portion or end cap 300, which is coupled to the shaft or linkage 190 having the U-shaped connector 192.

Again, as discussed above, the U-shaped connector 192 is configured to removably couple to the load connector 52 of the lift beam 22. Accordingly, in operation, the controller 152 may be configured to control the drive 282 to rotate in a clockwise or counterclockwise rotational direction, which causes rotation of the male threaded shaft or portion 288 in a clockwise or counterclockwise rotational direction 302, which in turn causes axial movement or translation of the female threaded portion 290, the inner sleeve 292, the shaft or linkage 190, and the U-shaped connector 192.

Figure 8:
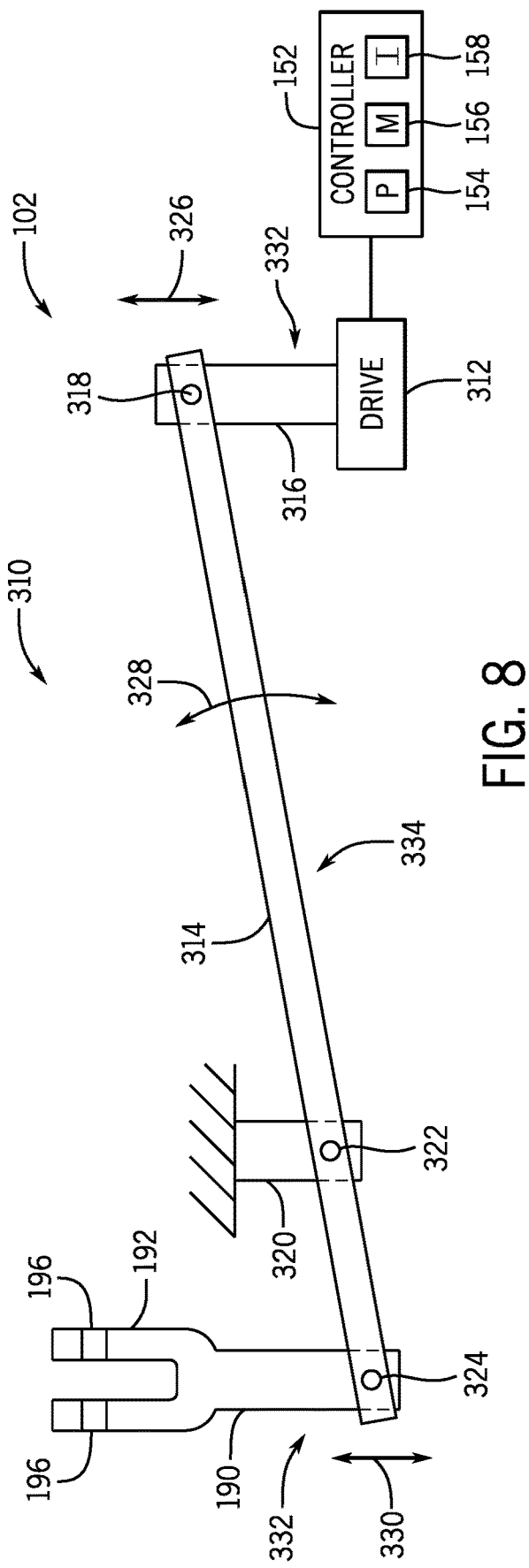
FIG. 8 is a schematic of an embodiment of a mechanical leverage drive system configured to provide a force to load test the lift beam of FIG. 2.

FIG. 8 is schematic of an embodiment of a mechanical leverage drive system 310 that may be used for one or more of the drives 102 as illustrated in FIGS. 2, 4, 5, and elsewhere in the application. As illustrated, the mechanical leverage drive system 310 includes the controller 152, a drive 312, a lever or arm 314, a shaft or linkage 316 extending between the drive 312 and a rotational joint 318 with the arm 314, a stationary mount or arm 320 extending to and coupled with the arm 314 at a rotational joint 322, and a rotational joint 324 between the arm 314 and the shaft or linkage 190. The drive 312 may include an electric drive or motor, a fluid drive or motor such as the fluid drive system 220, a geared drive system 280 as illustrated in FIG. 7, or any other suitable drive or motor. The drive 312 is configured to provide axial movement of the shaft or linkage 316 as indicated by arrow 326, which causes rotation of the arm 314 about the rotational joint 322 as indicated by arrow 328. In turn, as the arm 314 rotates about the rotational joint 322, the arm 314 causes axial movement of the shaft or linkage 190 coupled to the rotational joint 324 as indicated by arrow 330. Accordingly, the axial motion 330 causes the shaft or linkage 190 and the U-shaped connector 192 to impart a force on the load connector 52 as discussed above in FIGS. 2, 4, and 5. Depending on the direction of motion 326 provided by the drive 312, the mechanical leverage drive system 310 may provide a tensile force or a compressive force on the load connector 52 as indicated by the arrow 330. In the illustrated embodiment, the shaft or linkage 316 and the shaft or linkage 190 may be described as translating components 332, while the arm 314 may be described as a rotating component 334.

Figure 9:
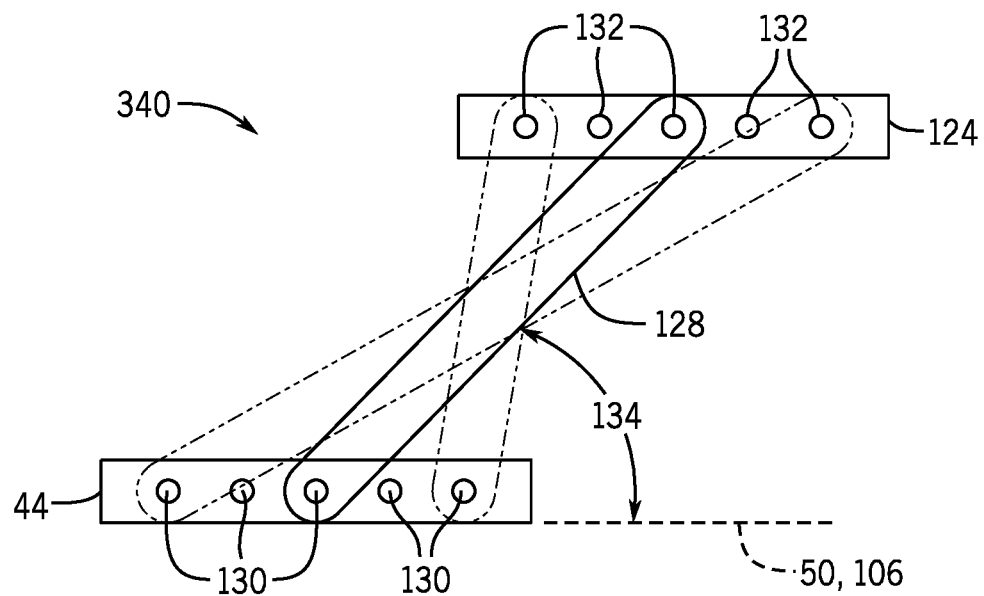
FIGS. 9, 10, and 11 are schematics of embodiments of a lift connection assembly configured to connect the lift beam with the reaction beam of FIG. 2, while allowing adjustability in an angle of a linkage between the reaction beam and the lift beam.

FIGS. 9, 10, 11, and 12 illustrate schematics of a lift connection assembly 340 having the linkage 128 disposed between the lift connector 44 and the connector 124 of the lift beam 22 and the reaction beam 104, respectively. FIG. 9 is a schematic of an embodiment of the lift connection assembly 340 having five connection joints 130 along the lift connector 44 and an equal number of five connection joints 132 along the connector 124. Accordingly, the linkage 128 may be selectively coupled to any one of the five connection joints 130 and any one of the five connection joints 132 to change an angle 134 of the linkage 128 relative to the longitudinal axes 50 and 106 of the beams 22 and 104, respectively. In this manner, the angle 134 may be adjusted to simulate an actual lifting operation as illustrated in FIG. 1.

Figure 10:
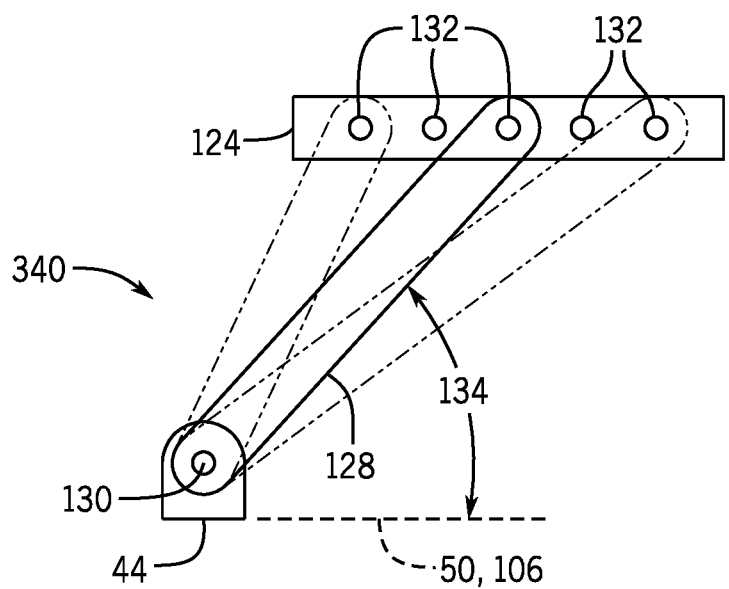

FIG. 10 is a schematic of an embodiment of the lift connection assembly 340 having a single connection joint 130 disposed on the lift connector 44 and a greater number of five connection joints 132 disposed on the connector 124. Accordingly, the linkage 128 has only one connection option on the lift connector 44 but the linkage 128 has multiple options along the connector 124 to change the angle 134 relative to the longitudinal axes 50 and 106 of the beams 22 and 104, respectively.

Figure 11:
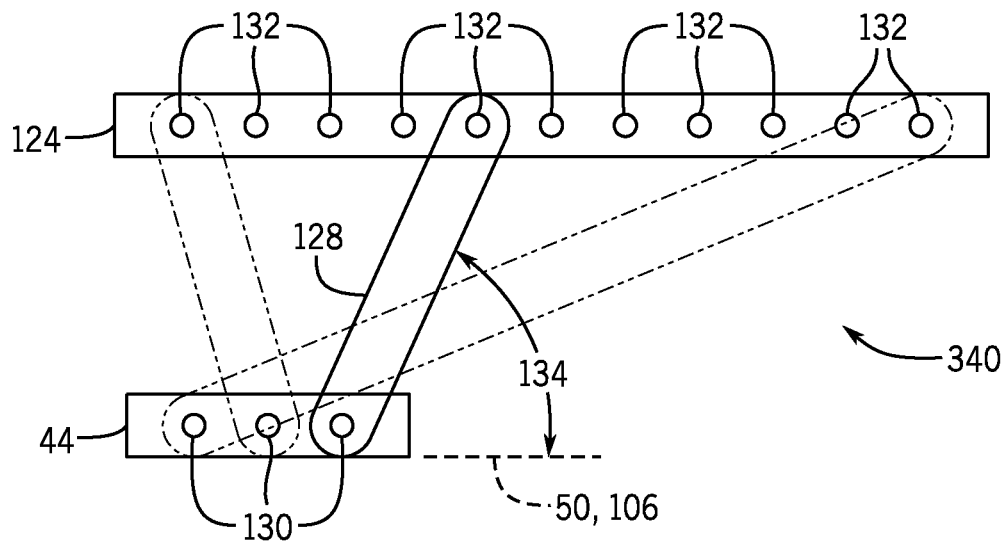

FIG. 11 is a schematic of an embodiment of the lift connection assembly 340 having multiple connection joints 130 on the lift connector 44 and multiple connection joints 132 on the connector 124. However, the number of connection joints 130 and 132 differ from one another. In particular, in the illustrated embodiment, the number of connection joints 132 is greater than the number of connection joints 130. In some embodiments, the number of connection joints 130 may be greater than the number of connection joints 132. The multiple connection joints 130 and 132 enable multiple positions of the linkage 128 relative to both the lift connector 44 and the connector 124, thereby allowing an adjustable angle 134 between the linkage 128 and the longitudinal axes 50 and 106 of the beams 22 and 104, respectively.

Figure 12:
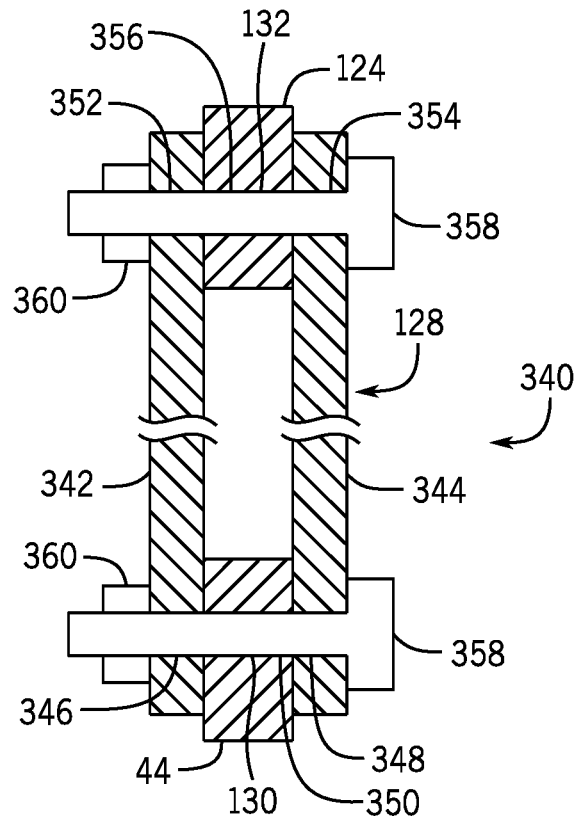
FIG. 12 is a schematic of an embodiment of the lift connection assembly of FIGS. 9, 10, and 11, further illustrating details of the connections at the lift beam and the reaction beam.

FIG. 12 is a schematic side view of the lift connection assembly 340 of FIGS. 2, 9, 10, and 11. As illustrated, the linkage 128 includes opposite arms or bars 342 and 344 extending between the lift connector 44 and the connector 124. The arms or bars 342 and 344 include fastener receptacles 346 and 348 aligned with the fastener receptacle 350 in the lift connector 44. Similarly, the arms or bars 342 and 344 include fastener receptacles 352 and 354 aligned with a fastener receptacle 356 in the connector 124. One or more threaded fasteners may be used to couple the arms or bars 342 and 344 with the fastener receptacles at the lift connector 44 and the connector 124. For example, a threaded fastener 358 may extend through the fastener receptacles 346, 348, and 350, and a female threaded fastener 360 is coupled to the threaded fastener 358 on an opposite side of the arms or bars 342 and 344. Similarly, a threaded fastener 358 extends through the fastener receptacles 352, 354, and 356 and connects with a female threaded fastener 360 at an opposite side of the arms or bars 342 and 344. Although a single threaded fastener 358 and female threaded fastener 360 are shown at each of the connectors 44 and 124, embodiments of the lift connection assembly 340 may include multiple (e.g., 2, 3, 4, 5, or more) threaded fasteners 358 and female threaded fasteners 360 at each of the connectors 44 and 124.

Figure 13:
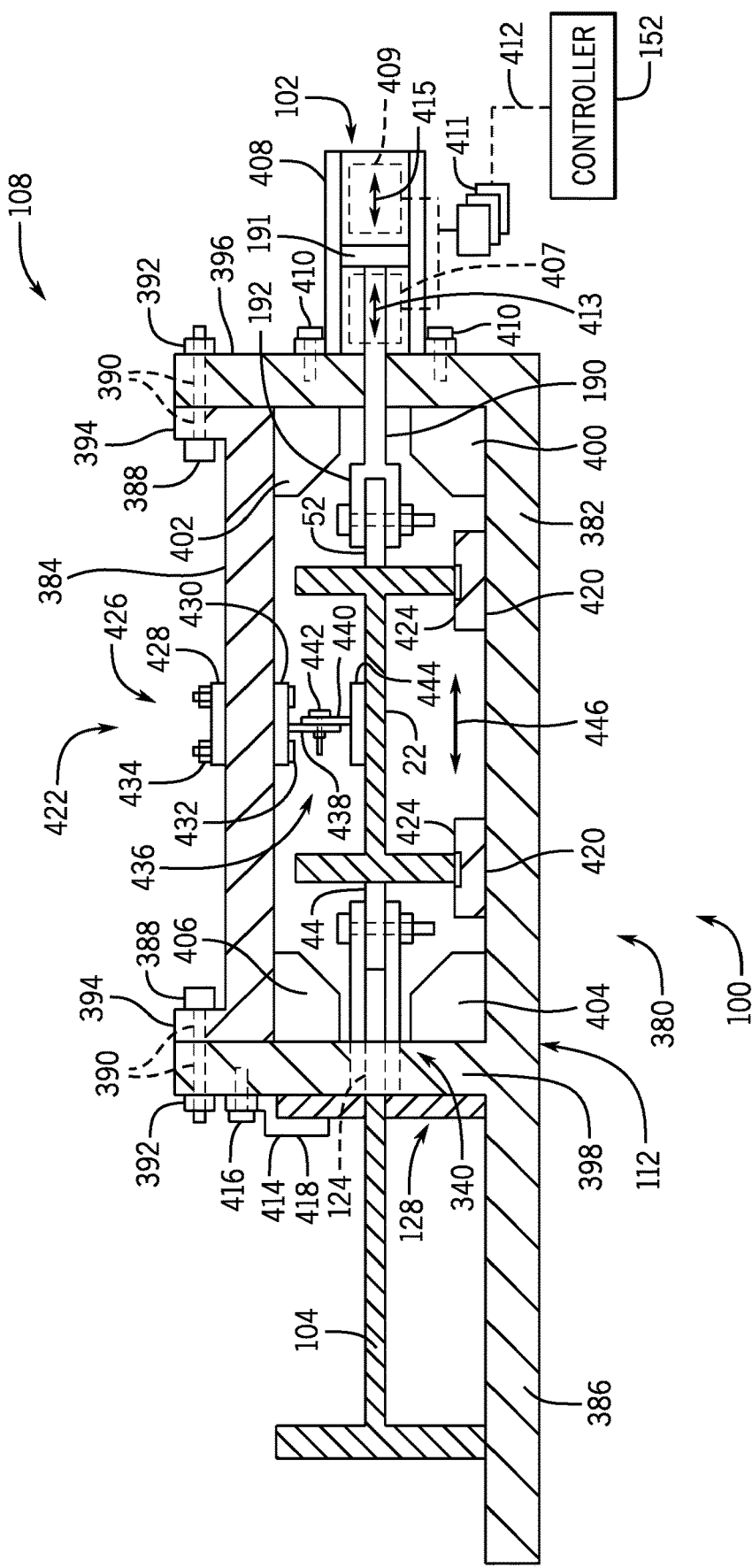
FIG. 13 is a schematic of an embodiment of the load testing framework of FIG. 2, illustrating a support with multiple frame sections configured to enable easy insertion and removal of the lift beam and the reaction beam for performing a load test.

FIG. 13 is a schematic side view of an embodiment of the load testing framework 100 of FIG. 2, illustrating details of the frame 112 of the support 108. In the illustrated embodiment, the frame 112 of the support 108 includes a plurality of frame sections 380 removably coupled together about the lift beam 22 and the reaction beam 104. The frame sections 380 include a support base or frame section 382 removably coupled to a support cover or frame section 384 about the lift beam 22 (and a receptacle that receives the lift beam 22). The frame section 384 may be removable from the frame section 382, such that an opening into the receptacle of the frame 112 is revealed for installation of the lift beam 22. The frame sections 380 also include a beam support or mount 386 disposed along the reaction beam 104. The mount 386 and the frame section 382 may be removably coupled together or formed as one piece (i.e., a single continuous body). The frame section 384 may be removably coupled to the frame section 382 via a plurality of fasteners (e.g., male threaded fasteners 388) extending through the frame section 384 and the frame section 382 via fastener receptacles 390 and secured via mating fasteners (e.g., female threaded fasteners 392). As illustrated, the frame section 384 may include a flange or lip 394 disposed adjacent each of the opposite end walls 396 and 398 of the frame section 382. Accordingly, the male threaded fasteners 388 extend through the fastener receptacles 390 in the flange or lip 394 and the end walls 396, 398 and couple with the female threaded fasteners 392.

The frame 112 also may include a plurality of spacers or guides 400, 402, 404, and 406 configured to help hold and guide the lift beam 22 and the connections 44 and 52 within the frame 112. For example, the spacers or guides 400 and 402 may be disposed in the corners of the frame 112 at the end wall 396, while the spacers or guides 404 and 406 may be disposed in the corners of the frame 112 at the end wall 398. The spacers or guides 400, 402, 404, and 406 may be removably or fixedly coupled to the frame 112 via welds, threaded fasteners, or other mechanical connections. The spacers or guides 400, 402, 404, and 406 may provide structural support at the corners of the frame 112, while also helping to support and guide the connections 44 and 52 with the drive 102 and the reaction beam 104.

For example, the load connector 52 is coupled to the shaft or linkage 190 via the U-shaped connector 192, and the shaft or linkage 190 is coupled to the drive 102. The drive 102 may include first and second internal drive portions 407 and 409 disposed in a drive mount 408, which may be fixedly and/or removably coupled to the end wall 396. For example, the drive mount 408 may be coupled to the end wall 396 fixedly via welded joints or removably via a plurality of threaded fasteners 410. The drive mount 408 may include a housing or body (e.g., an annular housing) having the head portion 191 of the shaft or linkage 190 disposed between the first and second internal drive portions 407 and 409. The drive 102 may include a fluid drive such as the fluid drive system 220 of FIG. 6, a geared drive system 280 as illustrated in FIG. 7, a mechanical leverage drive system 310 as illustrated in FIG. 8, an electric drive, or another suitable drive. Accordingly, each of the first and second internal drive portions 407 and 409 may include parts of the same drive or different drives.

For example, the first and second internal drive portions 407 and 409 may include first and second fluid drives (e.g., fluid chambers), first and second electric drives, first and second geared drives, or first and second leverage drivees disposed on opposite sides of the head portion 191 of the shaft or linkage 190. In a fluid drive embodiment, the head portion 191 may be a piston and the fluid drive may have a configuration similar to the embodiment of FIG. 6. Additionally, the drive 102 may include one or more external drive portions 411 coupled to the first and second internal drive portions 407 and 409. The external drive portions 411 may include electric motors, pumps, valves, regulators, electronics, sensors, or any combination thereof, configured to support operation of the internal drive portions 407 and 409. The drive 102 is also communicatively coupled with the controller 152 via one or more control lines 412, which may couple to the one or more external drive portions 411 and the first and second internal drive portions 407 and 409. The control lines 412 may include data communication lines, electric lines, and/or fluid lines to facilitate operation of the drive portions 407, 409, and 411.

The lift connector 44 is coupled to the reaction beam 104 via the lift connection assembly 340 having the linkage 128 extending between the lift connector 44 and the connector 124 as discussed above. The frame 112 also may include one or more beam retainers or clamps 414 coupled to the end wall 398 of the frame 112 via one or more fasteners (e.g., threaded fasteners 416), and extending over a portion of the reaction beam 104. For example, the clamp 414 may include a raised clamp portion 418 extending over an edge portion of the reaction beam 104. In certain embodiments, the clamp 414 may provide some clearance or freedom of movement of the reaction beam 104 in the direction of arrows 446. For example, during load testing, the reaction beam 104 may move slightly (e.g., 10-40 mm) in the direction of arrows 446 due to the application of loads by the drives 102 and/or bending (e.g., bowing) of the lift beam 22 and the reaction beam 104 (e.g., bowing of the beams 22 and 104 toward or away from one another).

Inside the frame 112, the lift beam 22 may be supported via one or more spacers, such as spacers 420 and an adjustable spacer 422. The spacers 420 may be removably or fixedly coupled to the frame section 382 via welds, threaded fasteners, or other fasteners. During load testing, the lift beam 22 may move slightly (e.g., 10-40 mm) in the direction of arrows 446 due to the application of loads by the drives 102 and/or bending (e.g., bowing) of the lift beam 22 and the reaction beam 104 (e.g., bowing of the beams 22 and 104 toward or away from one another). Accordingly, the spacers 420 and the adjustable spacers 422 are configured to block lateral movement of the lift beam 22 crosswise to the lift and load connectors 44 and 52 (e.g., crosswise to arrows 446), while enabling movement of lift beam 22 along the lift and load connectors 44 and 52 (e.g., parallel to arrows 446). For example, the spacers 420 and the adjustable spacers 422 may include friction reducing materials and/or rollers along the lift beam 22, and an intermediate gap or spacing may be disposed between the lift beam 22 and the spacers 420 and the adjustable spacers 422. The spacers 420 also may include friction reducing materials and/or rollers along the frame section 382. These spacings, friction reducing materials, and rollers help to facilitate sliding movement of the lift beam 22 along the spacers 420 and 422 and the frame section 382. The friction reducing materials may include coatings made of lower friction materials than a core material of the spacers 420 and 422, or the entirety of the spacers 420 and 422 may be made of the lower friction materials. The lower friction materials may include plastic, metal, and/or ceramic materials, such as polytetrafluoroethylene (PTFE), nickel, nickel boron nitride, nickel PTFE, tungsten disulfide, molybdenum disulfide, hard chrome, or any combination thereof. The rollers may include roller balls, cylinders, wheels, or bearings. The spacers 420 also may include recesses 424 configured to receive a portion of the lift beam 22. The recesses 424 may be oversized to enable freedom of movement of the lift beam 22 in the direction of arrows 446.

The adjustable spacer 422 may be removably coupled to the frame section 384 via a clamp assembly 426 having clamping plates 428 and 430 disposed on opposite outer and inner sides of the frame section 384 and having fasteners (e.g., male threaded fasteners 432) extending through the plates 428 and 430 and the frame section 384 and secured via mating fasteners (e.g., female threaded fasteners 434). The clamp assembly 426 also may be coupled to an adjustable spacer arm assembly 436 having arms 438 and 440 removably coupled together via one or more fasteners (e.g., threaded fasteners 442, such as mating male and female threaded fasteners). For example, the spacer arm 438 may be removably or fixedly coupled to the plate 430 of the clamp assembly 426, while the spacer arm 440 is removably or fixedly coupled to a spacer plate or mount 444 disposed along a surface of the lift beam 22. The height or length of the spacer arm assembly 436 may be adjusted by extending or retracting the spacer arms 438 and 440 relative to one another, and then securing the relative positions of the spacer arms 438 and 440 by tightening the threaded fasteners 442. For example, the threaded fasteners 442 (e.g., male threaded fasteners) may extend through elongated slots in the spacer arms 438 and 440, such that the threaded fasteners 442 can slide along the elongated slots as the spacer arms 438 are extended and retracted between the frame section 384 and the lift beam 22. In this manner, the spacers 420 and the adjustable spacer 422 may secure the position of the lift beam 22 within the frame 12.

In operation, the controller 152 is configured to control the drive 102 to apply a force to the load connector 52 through the shaft or linkage 190, while the load connector 44 is held by the linkage 128 and the reaction beam 104 is disposed against the end wall 398. Accordingly, the controller 152 is configured to control the drive 102 to perform a load test by providing a tensile force and/or a compressive force in the lift beam 22 as indicated by arrow 446. For example, the drive 102 may operate the first internal drive portion 407 to apply forces between the end wall 396 of the frame 112 and the head portion 191 of the shaft or linkage 190 as indicated by arrows 413, thereby driving the shaft or linkage 190 away from the lift beam 22 to apply tensile forces on the lift and load connectors 44 and 52. Alternatively, the drive 102 may operate the second internal drive portion 409 to apply forces between the drive mount 408 coupled to the frame 112 and the head portion 191 of the shaft or linkage 190 as indicated by arrows 415, thereby driving the shaft or linkage 190 toward the lift beam 22 to apply compressive forces on the lift and load connectors 44 and 52.

In the illustrated embodiment, the load test framework 100 may be configured for a horizontal orientation to facilitate load testing of the lift beam 22 in a horizontal orientation rather than a vertical orientation. In certain embodiments, the load testing framework 100 of FIG. 13 may also be oriented in a vertical orientation or any other acutely angled orientation between horizontal and vertical orientations, thereby facilitating load testing of the lift beam 22 in the vertical or acutely angled orientations.

Figures 14, 15:
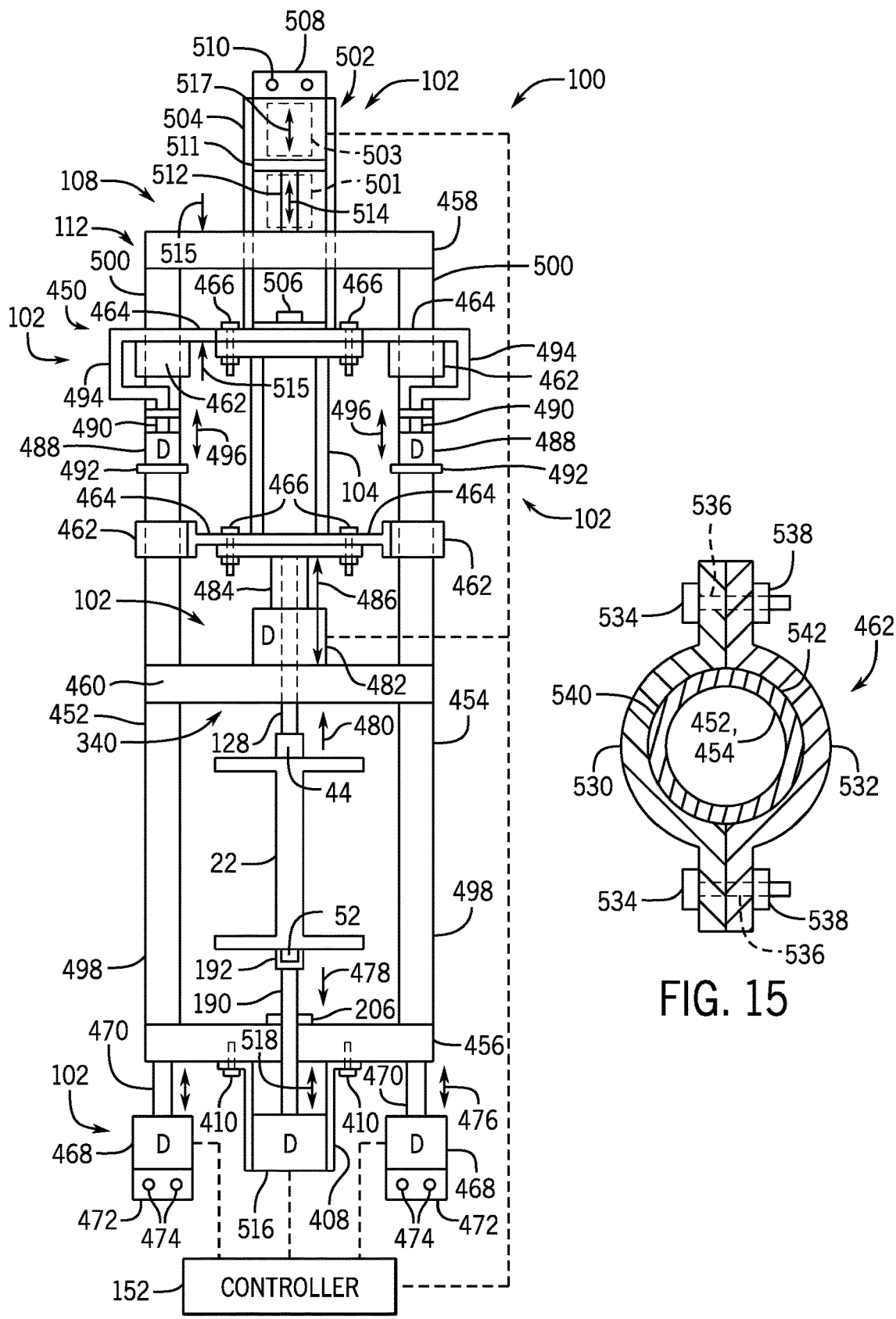
FIG. 14 is a schematic of an embodiment of the load testing framework of FIG. 2, illustrating one or more drives configured to move a support relative to the reaction beam and the lift beam for load testing the lift beam.
FIG. 15 is a schematic of an embodiment of brackets or sleeves used to connect with lateral frame sections of the support of FIG. 14.

FIG. 14 is a schematic of an embodiment of the load testing framework 100, illustrating a movable frame configuration 450 of the frame 112 of the support 108. In the illustrated embodiment, the movable frame configuration 450 includes one or more drives 102 configured to move the frame 112 relative to the lift beam 22 and/or the reaction beam 104. The moveable frame configuration 450 of the supports 108 may help to accommodate movement of the lift beam 22 and/or the reaction beam 104 during load testing. For example, as the drives 102 apply forces for load testing, the lift beam 22 and/or the reaction beam 104 may bend (e.g., bow) toward or away from one another, causing some deflection of the beams 22 and 104 at one or more of the supports 108. The moveable frame configuration 450 of the supports 108 can move in the direction of the applied forces, helping to accommodate the deflection of the beams 22 and 104.

As illustrated, the frame 112 includes lateral frame sections 452 and 454 disposed on opposite sides of the beams 22 and 104, end frame sections 456 and 458 disposed on opposite ends of the beams 22 and 104 and coupled to the lateral frame sections 452 and 454, and an intermediate frame section 460 disposed between the end frame sections 456 and 458 (e.g., between the beams 22 and 104) and coupled to the lateral frame sections 452 and 454. In the illustrated embodiment, the lateral frame sections 452 and 454 are parallel to one another, and the frame sections 456, 458, and 460 are parallel to one another and crosswise (e.g., perpendicular) to the lateral frame sections 452 and 454. The frame sections 452, 454, 456, 458, and 460 may be removably or fixedly coupled together via welded joints, threaded fasteners, or other fasteners. However, the frame sections 452, 454, 456, 458, and 460 may be formed as a single unitary frame structure in certain embodiments.

The frame 112 may be coupled to the reaction beam 104 via a plurality of brackets or sleeves 462 disposed about the lateral frame sections 452. The brackets or sleeves 462 may be coupled to upper and lower portions of the reaction beam 104 via mounting arms or plates 464, which may be fixedly or removably coupled to the reaction beam 104 via welded joints or threaded fasteners 466. In certain embodiments, the brackets or sleeves 462 are disposed movably about the lateral frame sections 452 and 454, such that the lateral frame sections 452 and 454 can slide along the interior of the brackets or sleeves 462. However, in some embodiments, the brackets or sleeves 462 may be removably clamped or fixedly coupled about the lateral frame sections 452 and 454, thereby blocking movement of the lateral frame sections 452 and 454 relative to the reaction beam 104.

For example, in embodiments enabling movement of the lateral frame sections 452 and 454 within the brackets or sleeves 462, one or more drives 102 may be configured to move the frame 112 relative to the beams 22 and 104. For example, the drives 102 may include drives 468 coupled to the end frame section 456, such that shafts 470 of the drives 468 are configured to extend and retract to move the frame 112 relative to the beams 22 and 104. Accordingly, the drives 468 may be coupled to a foundation or other support structure via drive mounts 472 and fasteners (e.g., threaded fasteners 474). For example, the drives 468 may be configured to move the frame 112 as indicated by arrows 476, which in turn provides a force on the load connector 52 and the lift connector 44 as indicated by arrows 478 and 480.

Additionally or alternatively, the drives 102 may include a drive 482 coupled to the intermediate frame section 460 and a portion of the reaction beam 104, such that the drive 482 may extend and retract a shaft 484 to cause movement of the frame 112 relative to the reaction beam 104 and the lift beam 22 as indicated by arrow 486. The drive 482 may be mounted with a fixed joint (e.g., a welded joint) or a removable connection (e.g., threaded joint, threaded fasteners, brackets, clamps, etc.) at the intermediate frame section 460 and the reaction beam 104. As a result of this movement, the frame 112 may transfer the forces on the lift beam 22 as indicated by arrows 478 and 480.

Additionally or alternatively, the drives 102 may include drives 488 coupled to one or both of the lateral frame sections 452 and 454. In certain embodiments, the drives 488 may be coaxial with and/or directly in-line with the lateral frame sections 452 and 454.

The drives 488 may include a shaft 490 configured to be extended and retracted between adjacent drive mounts 492 and 494 (e.g., mounting brackets) as indicated by arrows 496. The drives 488 are disposed between adjacent sections 498 and 500 of the lateral frame sections 452 and 454. In the illustrated embodiment, the drive mounts 492 are coupled to the sections 498 of the lateral frame sections 452 and 452, while the drive mounts 494 are coupled to the reaction beam 104. The drive mounts 492 and 494 may be coupled to the sections 498 and the reaction beam 104 with fixed joints (e.g., welds) or removable joints (e.g., removable fasteners, threaded bolts, threaded nuts, clamps, etc.). As illustrated, the drive mounts 494 may include rigid arms or extensions between the drives 488 and the mounting arms or plates 464. In operation, the drives 488 may be extended to force the frame 112 in a first direction away from the reaction beam 104 toward the lift beam 22, thereby transferring forces to the lift and load connectors 44 and 52 to place the lift beam 22 in tension. Additionally, the drives 488 may be retracted to force the frame 112 in a second direction (opposite the first direction) from the lift beam 22 toward the reaction beam 104, thereby transferring forces to the lift and load connectors 44 and 52 to place the lift beam 22 in compression.

In some embodiments, the drives 488 may extend and retract the shaft 490 between the adjacent sections 498 and 500 of the lateral frame sections 452 and 454, such that the adjacent sections 498 and 500 can expand and contract relative to one another as indicated by arrows 496. For example, each of the lateral frame sections 452 and 454 may have the drives 488 in-line or coaxial with the adjacent sections 498 and 500, which may be telescopic relative to one another. Additionally, the drives 488 may be coupled to the adjacent sections 498 and 500 of the lateral frame sections 452 and 454 via the drive mounts 492 and 494, which may be removably or fixedly coupled to the adjacent sections 498 and 500 via fixed joints (e.g., welds) or removable joints (e.g., removable fasteners, threaded bolts, threaded nuts, clamps, etc.). As the drives 48 extend the shafts 490 between the sections 498 and 500 of the lateral frame sections 452 and 454, the drives 488 cause an application of forces on the load connector 52 and the lift connector 44 as illustrated by arrows 478 and 480.

The drives 102 also may include one or more drives 502 disposed at the end frame section 458. The drive(s) 502 may be fixedly or removably coupled to a portion of the reaction beam 104 via a drive mount 504, which may extend around or partially through the end frame section 458 and couple to the reaction beam 104. For example, the drive mount 504 may be removably coupled to the reaction beam 104 via one or more fasteners (e.g., threaded fasteners 506). Additionally or alternatively, the drive mount 504 may include an additional drive mount portion 508 having one or more fasteners (e.g., threaded fasteners 510) coupled to another foundation or support structure. The drive 502 includes a shaft 512 extending to the end frame section 458, such that the drive 502 may be configured to extend or retract the shaft 512 to move the frame 112 relative to the beams 22 and 104. For example, the drive 502 may include first and second drive portions 501 and 503 disposed on opposite sides of a head portion 511 coupled to the shaft 512.

In operation, the first drive portion 501 of the drive 502 may be configured to apply forces between the head portion 511 and the frame 112 as indicated by arrow 514, thereby driving the end frame section 458 of the frame 112 and the reaction beam 104 toward one another as indicated by arrows 515, and applying tensile forces on the lift and load connectors 44 and 52 as indicated by arrows 478 and 480. Alternative, the second drive portion 503 of the drive 502 may be configured to apply forces between the head portion 511 and the drive mount 504 coupled to the frame 112 as indicated by arrow 517, thereby driving the end frame section 458 of the frame 112 and the reaction beam 104 away from one another (i.e., opposite from arrows 515), and applying compressive forces on the lift and load connectors 44 and 52 (i.e., opposite from arrows 478 and 480).

The drives 102 also may include a drive configuration similar to the arrangement shown in FIGS. 4 and 13. For example, the drives 102 may include a drive 516 coupled to the end frame section 456 via the drive mount 408 and threaded fasteners 410. The drive 516 is coupled to the shaft or linkage 190, which in turn couples to the load connector 52 via the U-shaped connector 192. Accordingly, the drive 516 may apply forces directly onto the load connector 52 as indicated by arrow 518. If the drive 516 retracts the shaft or linkage 190, then the drive 516 may cause an application of the force 478 on the load connector 52 and the force 480 on the lift connector 44. In this particular embodiment, the frame 112 may be disposed in a fixed position relative to the beams 22 and 104. Accordingly, the brackets or sleeves 462 may be clamped or secured about the lateral frame sections 452 and 454, thereby blocking movements of the frame 112 relative to the beams 22 and 104. However, in certain embodiments, the illustrated drives 102 may be used in combination with one another in the embodiment of FIG. 14.

In the illustrated embodiment of FIG. 14, the load testing framework 100 may be oriented in a vertical orientation. For example, the load testing framework 100 may be supported in a vertical orientation via the beam supports or mounts 109 illustrated in FIG. 2. In a vertical orientation, the supports 108 (e.g., movable frame configuration 450 of the frame 112) may contribute some weight (e.g., gravity) in combination with the forces applied by the drives 102 to facilitate the load testing of the lift beam 22. Accordingly, the controller 152 may be designed to use the combination of forces (e.g., weight of supports 108 and force from drives 102) for load testing of the lift beam 22. However, the embodiment of FIG. 14 also may be arranged in a horizontal orientation or any other suitable orientation (e.g., an angled orientation between horizontal and vertical orientations) with appropriate mounts to hold the load testing framework 100 in the desired orientation.

FIG. 15 is a schematic of an embodiment of the brackets or sleeves 462 of FIG. 14. As illustrated, the brackets or sleeves 462 may include opposite bracket sections 530 and 532 disposed about the lateral frame section 452 or 454. The bracket sections 530 and 532 may be removably coupled together via fasteners (e.g., male threaded fasteners 534) disposed through fastener receptacles 536 and secured by mating fasteners (e.g., female threaded fasteners 538). Each of the bracket sections 530 and 532 may surround a portion of the lateral frame section 452 or 454. The bracket sections 530 and 532 may be sized to enable movement of the lateral frame section 452 or 454 within an interior surface 540 of the brackets or sleeves 462. For example, in the movable frame configuration 450 of FIG. 14, the bracket sections 530 and 532 may leave some clearance for the lateral frame sections 452 and 454 to slide through the brackets or sleeves 462.

However, the brackets or sleeves 462 may be configured to clamp down on (or compressively surround) the lateral frame section 452 or 454 to positionally secure the lateral frame sections 452 or 454 within the brackets or sleeves 462 as discussed above. In the illustrated embodiment, the lateral frame section 452 and 454 have an annular or cylindrical construction (e.g., a hollow cylindrical tube 542), and the brackets or sleeves 462 have a similar annular or cylindrical construction. However, the geometry of the brackets or sleeves 462 and the lateral frame sections 452 and 454 may have other shapes, such as a square geometry, a rectangular geometry, an oval geometry, etc.

Technical effects of the disclosed embodiments include systems and methods for load testing a lift beam (or other lift structure) using one or more drives (e.g., fluid drives, electric drives, geared drives, leverage drives, etc.) rather than relying solely on gravity objects (e.g., concrete blocks, water balloons, etc.) to apply a load to the lift beam. The use of drives, rather than gravity, enables load testing in a variety of orientations, such as a horizontal orientation, a vertical orientation, or an angled orientation between horizontal and vertical orientations. The use of drives consumes considerably less space than the gravity objects. The use of drives also enables controlled simulations of loads on the lift beam, including variations on the forces over time, variations of the forces in different positions, and variations in forces attributed to certain environmental or operating conditions.

The subject matter described in detail above may be defined by one or more clauses, as set forth below.

A system for load testing a lift beam includes a load testing framework configured to support the lift beam. The system includes a first connector configured to couple with a lift connector of the lift beam, and a second connector configured to couple with a load connector of the lift beam. The system also includes at least one drive configured to force the lift and load connectors away from one another to load test the lift beam.

The system of any preceding clause, wherein the at least one drive comprises a fluid drive having a piston.

The system of any preceding clause, wherein the at least one drive comprises an electric drive.

The system of any preceding clause, wherein the at least one drive is configured to transfer motion through one or more of: a shaft, a gear, a spiral path or threads, a rotating component, a translating component, or a combination thereof.

The system of any preceding clause, wherein the at least one drive comprises a lever assembly having a lever coupled to a pivot joint.

The system of any preceding clause, wherein a first linkage is configured to extend between and couple to the first connector and the lift connector.

The system of any preceding clause, wherein the first linkage is configured to be oriented at an acute angle relative to a longitudinal axis of the lift beam.

The system of any preceding clause, wherein the first connector comprises a plurality of connection joints, and the first linkage is selectively coupled to one of the plurality of connection joints to vary an angle of the first linkage relative to a longitudinal axis of the lift beam.

The system of any preceding clause, comprising a plurality of first connectors including the first connector, wherein the plurality of first connectors is configured to couple with respective lift connectors of the lift beam at different axial positions relative to a longitudinal axis of the lift beam.

The system of any preceding clause, comprising a plurality of second connectors including the second connector, wherein the plurality of second connectors is configured to couple with respective load connectors of the lift beam at different axial positions relative to the longitudinal axis of the lift beam.

The system of any preceding clause, wherein the load testing framework comprises a plurality of supports configured to be disposed at the different axial positions.

The system of any preceding clause, wherein the at least one drive comprises a plurality of drives, and each drive of the plurality of drives is configured to generate and apply a force relative to one of the plurality of second connectors.

The system of any preceding clause, wherein the plurality of drives is configured to independently vary the forces to the plurality of second connectors.

The system of any preceding clause, wherein each of the plurality of second connectors is coupled to one of the plurality of drives.

The system of any preceding clause, wherein each of the plurality of supports is driven to move by one of the plurality of drives, and each of the plurality of supports is coupled to one of the plurality of second connectors.

The system of any preceding clause, wherein each of the plurality of supports comprises a frame extending around a receptacle configured to receive the lift beam.

The system of any preceding clause, wherein the frame comprises a first frame section and second frame section, and the first frame section is removable from the second frame section to reveal an opening into the receptacle.

The system of any preceding clause, wherein the load testing framework comprises a reaction beam, wherein the plurality of supports is coupled to the reaction beam at the different axial positions.

A system for load testing a lift beam includes a load testing framework. The load testing framework includes a reaction beam, and a plurality of supports coupled to the reaction beam at different axial positions along a longitudinal axis of the reaction beam, wherein the plurality of supports is configured to support the lift beam lengthwise along the longitudinal axis of the reaction beam. The load testing framework includes a plurality of first connectors coupled to the reaction beam, and a plurality of first linkages. Each of the plurality of first linkages is configured to extend between and couple one of the plurality of first connectors with a respective one of a plurality of lift connectors of the lift beam, each of the plurality of first connectors includes a plurality of connection joints, and the first linkage is selectively coupled to one of the plurality of connection joints to vary an angle of the first linkage relative to the longitudinal axis of the reaction beam. The load testing framework includes a plurality of second connectors, wherein each of the plurality of second connectors is configured to couple with a respective one of a plurality of load connectors of the lift beam, and each of the plurality of second connectors is associated with a respective one of the plurality of supports. The load testing framework includes a plurality of drives configured to force the lift and load connectors away from one another to load test the lift beam.

A method for load testing a lift beam, includes supporting the lift beam with a load testing framework, coupling a first connector with a lift connector of the lift beam, and coupling a second connector with a load connector of the lift beam. The method also includes forcing, via at least one drive, the lift and load connectors away from one another to load test the lift beam.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for load testing a lift beam, comprising:
   a load testing framework configured to support the lift beam;
   a first connector configured to couple with a lift connector of the lift beam;
   a plurality of second connectors configured to couple with respective load connectors of the lift beam at first different axial positions relative to a longitudinal axis of the lift beam; and
   a plurality of drives configured to force the lift and load connectors away from one another in opposite directions in a common plane to load test the lift beam, wherein each drive of the plurality of drives is configured to generate and apply a force relative to one of the plurality of second connectors.

2. The system of claim 1, wherein at least one of the plurality of drives comprises a fluid drive having a piston.

3. The system of claim 1, wherein at least one of the plurality of drives comprises an electric drive.

4. The system of claim 1, wherein at least one of the plurality of drives is configured to transfer motion through one or more of: a shaft, a gear, a spiral path or threads, a rotating component, a translating component, or a combination thereof.

5. The system of claim 1, wherein at least one of the plurality of drives comprises a lever assembly having a lever coupled to a pivot joint.

6. The system of claim 1, wherein the opposite directions comprise a vertically upward direction and a vertically downward direction.

7. The system of claim 1, wherein a first linkage is configured to extend between and couple to the first connector and the lift connector, and the first linkage is configured to be oriented at an acute angle relative to the longitudinal axis of the lift beam.

8. The system of claim 1, wherein a first linkage is configured to extend between and couple to the first connector and the lift connector, the first connector comprises a plurality of connection joints, and the first linkage is selectively coupled to one of the plurality of connection joints to vary an angle of the first linkage relative to the longitudinal axis of the lift beam.

9. The system of claim 1, comprising a plurality of first connectors including the first connector, wherein the plurality of first connectors is configured to couple with respective lift connectors of the lift beam at second different axial positions relative to the longitudinal axis of the lift beam, wherein the first and second different axial positions are axially offset from one another.

10. The system of claim 1, wherein the lift connector is coupled to a first side of the lift beam, the load connectors are coupled to a second side of the lift beam, and the first and second sides are opposite from one another.

11. The system of claim 1, wherein the load testing framework comprises a plurality of supports configured to be disposed at the first different axial positions.

12. The system of claim 1, wherein the plurality of drives is configured to independently vary the forces to the plurality of second connectors to vary a load distribution along the lift beam.

13. The system of claim 10, wherein the first side is a top side of the lift beam, the second side is a bottom side of the lift beam, and each of the plurality of second connectors is coupled to one of the plurality of drives.

14. The system of claim 11, wherein each of the plurality of supports is driven to move by one of the plurality of drives, and each of the plurality of supports is coupled to one of the plurality of second connectors.

15. The system of claim 11, wherein each of the plurality of supports comprises a frame extending around a receptacle configured to receive the lift beam.

16. The system of claim 15, wherein the frame comprises a first frame section and second frame section, and the first frame section is removable from the second frame section to reveal an opening into the receptacle.

17. The system of claim 11, wherein the load testing framework comprises a reaction beam, wherein the plurality of supports is coupled to the reaction beam at the first different axial positions.

18. A system for load testing a lift beam, comprising:
   a load testing framework, comprising:
      a reaction beam;
      a plurality of supports coupled to the reaction beam at different axial positions along a longitudinal axis of the reaction beam, wherein the plurality of supports is configured to support the lift beam lengthwise along the longitudinal axis of the reaction beam;
      a plurality of first connectors coupled to the reaction beam;
      a plurality of first linkages, wherein each of the plurality of first linkages is configured to extend between and couple one of the plurality of first connectors with a respective one of a plurality of lift connectors of the lift beam, each of the plurality of first connectors comprises a plurality of connection joints, and the first linkage is selectively coupled to one of the plurality of connection joints to vary an angle of the first linkage relative to the longitudinal axis of the reaction beam;
      a plurality of second connectors, wherein each of the plurality of second connectors is configured to couple with a respective one of a plurality of load connectors of the lift beam, and each of the plurality of second connectors is associated with a respective one of the plurality of supports; and
      a plurality of drives configured to force the lift and load connectors away from one another in opposite directions in a common plane to load test the lift beam, wherein each drive of the plurality of drives is configured to generate and apply a force relative to one of the plurality of second connectors.

19. A method for load testing a lift beam, comprising:
   supporting the lift beam with a load testing framework;
   coupling a first connector with a lift connector of the lift beam;
   coupling a plurality of second connectors with respective load connectors of the lift beam at first different axial positions relative to a longitudinal axis of the lift beam; and
   forcing, via a plurality of drives, the lift and load connectors away from one another in opposite directions in a common plane to load test the lift beam, wherein each drive of the plurality of drives is configured to generate and apply a force relative to one of the plurality of second connectors.

20. The method of claim 19, wherein forcing comprises controlling the plurality of drives to independently vary the forces to the plurality of second connectors to vary a load distribution along the lift beam.

21. The method of claim 19, wherein the lift connector is coupled to a top side of the lift beam, the load connectors are coupled to a bottom side of the lift beam, and each of the plurality of second connectors is coupled to one of the plurality of drives.

22. The system of claim 18, wherein the plurality of drives is configured to independently vary the forces to the plurality of second connectors to vary a load distribution along the lift beam.

23. A system for load testing a lift beam, comprising:
a load testing framework configured to support the lift beam;
a first connector configured to couple with a lift connector of the lift beam;
a plurality of second connectors configured to couple with respective load connectors of the lift beam at first different axial positions relative to a longitudinal axis of the lift beam; and
a plurality of drives configured to force the lift and load connectors away from one another to load test the lift beam, wherein each drive of the plurality of drives is configured to generate and apply a force relative to one of the plurality of second connectors;
wherein the load testing framework comprises a plurality of supports configured to be disposed at the first different axial positions, and each of the plurality of supports comprises a frame extending around a receptacle configured to receive the lift beam.

* * * * *